United States Patent
Thiel et al.

(10) Patent No.: US 11,113,274 B1
(45) Date of Patent: Sep. 7, 2021

(54) SYSTEM AND METHOD FOR ENHANCED DATA ANALYTICS AND PRESENTATION THEREOF

(71) Applicant: Pointillist, Inc., Boston, MA (US)

(72) Inventors: Will Thiel, Boston, MA (US); Francois Silvain, Boston, MA (US); Tatiana Thomas, Boston, MA (US)

(73) Assignee: Pointillist, Inc., Boston, MA (US)

( * ) Notice: Subject to any disclaimer, the term of this patent is extended or adjusted under 35 U.S.C. 154(b) by 1067 days.

(21) Appl. No.: 15/252,765

(22) Filed: Aug. 31, 2016

Related U.S. Application Data

(60) Provisional application No. 62/212,146, filed on Aug. 31, 2015.

(51) Int. Cl.
| | |
|---|---|
| *G06F 16/242* | (2019.01) |
| *G06F 3/0484* | (2013.01) |
| *G06F 3/0482* | (2013.01) |
| *G06Q 30/02* | (2012.01) |
| *G06F 16/2457* | (2019.01) |
| *G06N 20/00* | (2019.01) |

(52) U.S. Cl.
CPC .......... *G06F 16/242* (2019.01); *G06F 3/0482* (2013.01); *G06F 3/0484* (2013.01); *G06F 16/24578* (2019.01); *G06N 20/00* (2019.01); *G06Q 30/0201* (2013.01)

(58) Field of Classification Search
CPC ............. G06F 16/242; G06F 16/24578; G06F 3/0482; G06F 3/0484; G06N 20/00; G06Q 30/0201
See application file for complete search history.

(56) References Cited

U.S. PATENT DOCUMENTS

| | | |
|---|---|---|
| D562,838 S | 2/2008 | Salunkhe |
| D590,410 S | 4/2009 | Wall et al. |
| D650,392 S | 12/2011 | Glezer |
| D661,701 S | 6/2012 | Brown |
| D681,656 S | 5/2013 | Lawrence et al. |
| D683,355 S | 5/2013 | Ridl |
| D687,457 S | 8/2013 | Edwards et al. |
| D711,896 S | 8/2014 | Hanson et al. |
| D715,317 S | 10/2014 | Pearce |
| D717,332 S | 11/2014 | Nies |
| D735,732 S | 8/2015 | Nezhad et al. |
| D743,412 S | 11/2015 | Danielyan et al. |
| D743,413 S | 11/2015 | Danielyan et al. |

(Continued)

OTHER PUBLICATIONS

USSN, Non-Final Office Action in U.S. Appl. No. 16/131,332, dated Sep. 5, 2019.

(Continued)

*Primary Examiner* — Charles D Adams
(74) *Attorney, Agent, or Firm* — Meunier Carlin & Curfman LLC

(57) ABSTRACT

Systems and methods for enhanced data analytics and presentation therefore are provided herein. In particular, systems and methods for graphically constructing a query for processing event-based data and identifying connections between two or more events, systems and methods for processing event-based data and identifying drivers in real-time across event-based data, and systems and methods for optimizing drivers for implementing actor encounters for achieving an objective.

5 Claims, 28 Drawing Sheets

(56) References Cited

U.S. PATENT DOCUMENTS

| | | |
|---|---|---|
| D754,165 S | 4/2016 | Park |
| D754,686 S | 4/2016 | Mandeville |
| D759,076 S | 6/2016 | Bain |
| D759,678 S | 6/2016 | Jung |
| D761,282 S | 7/2016 | Bain |
| D761,818 S | 7/2016 | Jung |
| D763,878 S | 8/2016 | Marteau et al. |
| D765,122 S | 8/2016 | Walters et al. |
| D765,688 S | 9/2016 | Mesguen et al. |
| D766,312 S | 9/2016 | Hedges |
| D766,918 S | 9/2016 | Mesguen et al. |
| D766,948 S | 9/2016 | Gebauer et al. |
| D766,951 S | 9/2016 | Wang |
| D769,293 S | 10/2016 | Colbeck et al. |
| D769,314 S | 10/2016 | Piroddi et al. |
| 9,460,237 B2 | 10/2016 | Nguyen |
| D772,889 S | 11/2016 | Carlson et al. |
| D772,891 S | 11/2016 | Nook et al. |
| D774,043 S | 12/2016 | Thompson et al. |
| D774,533 S | 12/2016 | Takahashi et al. |
| D776,143 S | 1/2017 | Makowski et al. |
| D777,195 S | 1/2017 | Dain et al. |
| D777,747 S | 1/2017 | Derby et al. |
| D781,302 S | 3/2017 | Baguley et al. |
| D781,306 S | 3/2017 | Kummer et al. |
| D781,910 S | 3/2017 | Day et al. |
| D785,023 S | 4/2017 | Willis |
| D791,142 S | 7/2017 | Lucas et al. |
| D799,521 S | 10/2017 | Potnuru et al. |
| D801,351 S | 10/2017 | Barni |
| D802,001 S | 11/2017 | Javed et al. |
| D802,011 S | 11/2017 | Friedman |
| 9,826,049 B2 | 11/2017 | Lim et al. |
| D805,535 S | 12/2017 | Danielyan et al. |
| D809,524 S | 2/2018 | Kato et al. |
| D809,544 S | 2/2018 | Ambielli |
| D810,109 S | 2/2018 | Makowski et al. |
| D810,111 S | 2/2018 | Garcia et al. |
| D812,634 S | 3/2018 | Tuthill et al. |
| D817,981 S | 5/2018 | Gofberg et al. |
| D820,297 S | 6/2018 | Gardner et al. |
| D826,257 S | 8/2018 | Thiel |
| 10,102,491 B2 | 10/2018 | Connolly |
| 10,223,926 B2 | 3/2019 | Agnew |
| D847,201 S | 4/2019 | Thiel |
| D847,825 S | 5/2019 | Coren |
| D857,708 S | 8/2019 | Brooks |
| 10,482,461 B2 | 11/2019 | Van Os |
| D877,188 S | 3/2020 | Williams |
| D894,939 S | 9/2020 | Braica |
| 2013/0080362 A1 | 3/2013 | Chang |
| 2015/0242782 A1 | 8/2015 | Onions |
| 2015/0347951 A1* | 12/2015 | Tamblyn ............ G06Q 30/0201 705/7.39 |
| 2015/0348088 A1 | 12/2015 | Mandeville |
| 2016/0247072 A1 | 8/2016 | Auger |
| 2016/0255161 A1 | 9/2016 | Lim et al. |
| 2017/0039576 A1 | 2/2017 | Gauthier |
| 2017/0039577 A1* | 2/2017 | Gauthier ............ G06Q 30/0201 |
| 2017/0188199 A1 | 6/2017 | Ashley, Jr. et al. |
| 2017/0235848 A1 | 8/2017 | Van Dusen et al. |
| 2018/0189820 A1 | 7/2018 | Cooperman et al. |
| 2019/0245934 A1 | 8/2019 | Chung |

OTHER PUBLICATIONS

Final Office Action issued for U.S. Appl. No. 16/131,332, dated Dec. 31, 2019.

Non-Final Office Action issued for U.S. Appl. No. 16/131,332, dated Jun. 26, 2020.

Office Action issued for U.S. Appl. No. 16/131,332, dated Dec. 9, 2020.

Santanu, Agus. "Schedule (Penjadwalan). "Scheduller, published Jun. 23, 2012 (Retrieved from the Internet Feb. 10, 2021). Internet URL: <http://agsantanu.blogspot.com/2021/06/>(Year: 2012).

Gagnon, Francis. "Concentric Circles on a Map, version 2.0." What We Think, published May 1, 2013 (Retrieved from the Internet Feb. 11, 2021). Internet URL: <https://chezvoila.com/blog/circles2/> (Year: 2013).

Volkov, Lubos. "Othercircles Icon set." Iconfinder, published Aug. 21, 2013 (Retrieved from the Internet Feb. 10, 2021). Internet URL: <http://www.iconfinder.com/iconsets/othercircles>(Year: 2013).

Office Action issued for U.S. Appl. No. 29/683,591, dated Feb. 17, 2021.

* cited by examiner

```
 1  metrics:
 2      daily sales value:
 3          field: total value
 4          event: sale
 5          aggregation: sum smoothed over 3 days
 6      daily purchases:
 7          event: sale
 8          aggregation: count smoothed over 3 days
 9      average value:
10          math: daily sales value / daily purchases
11      average value with email:
12          math: average value
13          received email: true
14      average value without email:
15          math: average value
16          received email: false
17      email value lift:
18          math: average value with email / average value without email - 1
19  timeframe: between 10/01/2014 6am and 10/31/2014 10pm est
20  by: day
21  from new story:
22      events:
23          sale:
24              event type: order confirmed
25              total value: > $5
26          email:
27              event type: email delivered
28              event time: timeframe
29              root:
30                  campaign name:
31                      - member discount
32                      - the big * sale
33                  groups:
34                      campaigns: campaign name
35          website:
36              event type: web hit
37          mobile:
38              event type: mobile log
39      actors:
40          customer:
41              actor type: account
42              segment:
43                  - family
44                  - young professional
45      connections:
46          from web:
47              actor: customer
48              relation: website precedes sale by < 1 hour
49          from mobile:
50              actor: customer
51              relation: mobile precedes sale by < 1 hour
52          customer:
53              actor: customer
54              groups:
55                  received email: email precedes sale by <= 10 days
56      logic:
57          from web or from mobile
```

*FIG. 4*

| | | | |
|---|---|---|---|
| *Not Null | UID* | Assigned automatically to enable updates | |
| | EventTime* | Time of the event | "eventTime" : "2011-07-14T19:43:37+0100", |
| | Actors* | People, places, and things associated with the event | "actors" : {<br>  "customer" : 298374,<br>  "product" : 84972634,<br>  "channel" : "website"<br>}, |
| | EventType* | Type of event | "eventType" : "purchase", |
| | Labels | Categorical labels to use for filtering and grouping | "labels" : {<br>  "source" : "google",<br>  "isMember" : true<br>}, |
| | Values | Numerical values for filtering, calculation, and aggregation | "values" : {<br>  "purchaseAmount" : 42.55,<br>  "items" : 5<br>}, |
| | Location | Geographic data | "location" : {<br>  "coordinates" : "-72.04382 45.67893",<br>  "zip" : "82384"<br>}, |
| | FlexData | Blob to support new functionality | "flexData" : ......... |

*FIG. 41*

SYSTEM AND METHOD FOR ENHANCED DATA ANALYTICS AND PRESENTATION THEREOF

CROSS-REFERENCE TO RELATED APPLICATION

This application claims the benefit of priority to U.S. Provisional Patent Application No. 62/212,146, filed on Aug. 31, 2015, entitled "SYSTEM AND METHOD FOR ENHANCED DATA ANALYTICS AND PRESENTATION THEREOF," the contents of which are hereby incorporated by reference in their entirety.

BACKGROUND

In any customer-focused industry the success of a business depends upon the entirety of the customer journey. Today, data points representing events along a customer journey may be recorded in a database, and these data points can be aggregated to measure key performance indicators (KPIs) essential to assessing enterprise performance, but the root causes driving those KPIs cannot be directly ascertained from the underlying data. This is because root causes are contained within journeys (sets of heterogeneous, inter-related events unfolding over time), and simple aggregations of data points, and even machine learning upon those data points, cannot penetrate the complexity of true journey analysis.

Journeys can be defined not only by if a customer saw an ad, or when a customer visited a website, or what a customer purchased, or even who a customer is, but can be defined as everything the customer has ever done, how those events are related to each other in time, and who or what else participated in those events. Analyzing journeys requires analyzing all of a customer's interactions simultaneously—including the gaps between events and the state of the customer at the time they participated in those events. Communicating and understanding journeys require new ways of visualizing and interacting with data which convey this enormous complexity in a form which is intuitive to non-analytical users.

Conventional systems are unable to deliver such functions. While marketing teams can monitor KPIs, track trends, "slice and dice" results on a current snapshot or aggregation of the marketing or other customer-related data, this offers only a limited (and often out-of-date) view of a limited subset of available data. For instance, they know what total sales per period are and drill down in multiple dimensions, they can identify who are the most profitable customers or follow, for example, the Net Promoter Score; however, it is very difficult, if not impossible in multi-channel and multi-process organization, to determine the customer experiences (interactions and other events that shape customers' perceptions of the brand) that explain trends or variation in these metrics. In reality, each customer traces a unique path through the organization—and those pathways lead to different results. Understanding these paths and their influence on the metric requires new capabilities to shape the customer journey and maximize the business performance.

By transcending the silos retaining data in particular channels, processes or organizations, and by preserving the integrity of each customer journey, a new world of questioning becomes possible. For instance, in addition to knowing what the Net Promoter Score (NPS) of the company is, marketers may be able to effectively understand how customer interactions influences the NPS and identify where they should take action and reshape the customer experience for improving the overall score.

Accordingly, because customer journeys are behind every marketing metric and the business outcomes for which marketing teams are responsible, marketing teams need a solution specialized in revealing the story behind each metric, what drivers influence it and how to shape the customer journey to maximize business value. The present disclosure provides such systems and methods.

SUMMARY

The systems and methods disclosed herein provide new and improved customer intelligence platforms that can combine big data, machine learning, advanced analytics and optimization engine(s) to solve one of the most critical challenges met by data processing departments today. The system enables modeling of optimal customer journeys that maximize business value. This disclosure thus introduces new data paradigms, a new computing platform, new algorithms, and new ways of visualizing and interacting with data to accommodate this new way of treating or processing data.

In certain embodiments, the system may provide one or more of the following technical solutions:

A specialized marketing data model which provides a complete view of the customer experience across disparate data sources, channels and processes, while preserving the integrity of the customer Journey Machine learning that automatically identifies customer journeys, key drivers and key customer characteristics or clusters that influence the customer experience to reveal new trends and opportunities An advanced analytics and model generator that automatically discovers and applies the best optimization for a particular key driver A real-time action optimization engine that trigger event in key Paths in the customer Journey to shape the customer experience and maximize impact The system may be described in terms of a number of components and sub-systems allowing for the operations described herein to be executed. In certain embodiments, the system may take a multitude of data from potentially disparate sources and aggregate the data to a form useable by the system. The system may then provide capability for discovering customer stories and identifying key drivers though which users and the system may be able to optimize performance and predict opportunities. Further, the system may allow for setting triggers and alerts to provide a user instantaneous real-time opportunities to maximum sales performance based upon predictive analysis of data aggregated within the system.

Thus, the system may give a new perspective on the marketing data by aggregating all the customer interactions and associated data collected across disparate data sources, channels and processes, and by preserving the integrity of the customer journey. This approach enables not only to reveal the story behind each metrics or KPI but also to apply machine learning and predictive analytics to automatically discover the key drivers that influence the metric and predict customers' behavior as a function of their current interactions.

Once the key drivers—for example, which set of events maximized the number of customers taking a positive journey—are identified the system, the system may be configured to propose the best optimization and evaluate the value of the opportunity by leveraging an automatic models optimizer. In one aspect, the system enables marketing executives to get new marketing insights, discover opportunities across the customer journey and take optimized actions. This and other features and benefits of the system are described more fully herein.

As described, in one aspect, the system can enable marketing analysts or marketing managers to discover performance driven drivers (a/k/a customer change opportunities) in an automated fashion from a complex dataset. Further aspects of the system may include:

- Reveal richer insights by executing deeper analyses in less time: Real-time analysis of the unified customer journey, across all relevant data sources, for both, individual customer and in aggregate.
- Predictive analysis across all customer sets and channels: Become aware of emergent trends in the customer journeys, both positive and negative, as they appear through machine learning and continuous, automated data mining
- Shortened timeframe between identified opportunities and execution: Ability to Trigger immediate, optimized actions based on real-time predictions of customer behavior and outcomes
- Continuous improvement and business optimization: Certain embodiments of the systems described herein can learn as they monitor the success of actions and uncovers why and for whom they were successful. The system intelligently iterates on action design to maximize the value of each interaction at each step of the customer life cycle by using adapted lift models
- Self-assembling data: Immediately upon intake, all data is integrated into a single unified data structure which can be immediately analyzed and explored without the need for "schemas" and "joins"
- Full-resolution analysis: In contrast to conventional machine learning techniques, the proprietary algorithms disclosed herein use raw data without the need to impose additional structure; e.g., flattening, homogenizing, replacement of "missing" data, and aggregating. The algorithms disclosed herein can use a combination of both recipes for data ingestion as well as late binding algorithms for the data with actor equivalence.
- Machine learning upon proprietary data structures: The proprietary algorithms disclosed herein employ the latest machine learning technologies upon data with depth and complexity which would be infeasible without the proprietary specialized platform disclosed herein.

As set forth herein, the above features may be accomplished, in varying embodiments, by the disclosed systems in which event-based data structure entries from various disparate electronic sources may be gathered, processed, harmonized, and/or utilized to provide instantaneous or nearly real-time feedback in the form of an easy-to-understand and intuitive graphical user interface for providing information relating to consumer behaviors, patterns, and/or trends. Through use of the system, marketing executives and other users can monitor and understand how cross-channel customer interactions are driving results. For any key driver, the system can recommend best options to improve outcomes and, with a single click in a graphical interface, deploy predictive models directly into their operations to lift results.

Advantages of the system will become apparent from the following detailed description. Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

To facilitate an understanding of and for the purpose of illustrating the present disclosure, exemplary features and implementations are disclosed in the accompanying drawings, it being understood, however, that the present disclosure is not limited to the precise arrangements and instrumentalities shown, and wherein similar reference characters denote similar elements throughout the several views. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 4 illustrates an example query format in accordance with the present disclosure.

FIG. 41 illustrates an example event data format in accordance with the present disclosure.

DETAILED DESCRIPTION OF EXEMPLARY EMBODIMENTS

Figure 1:
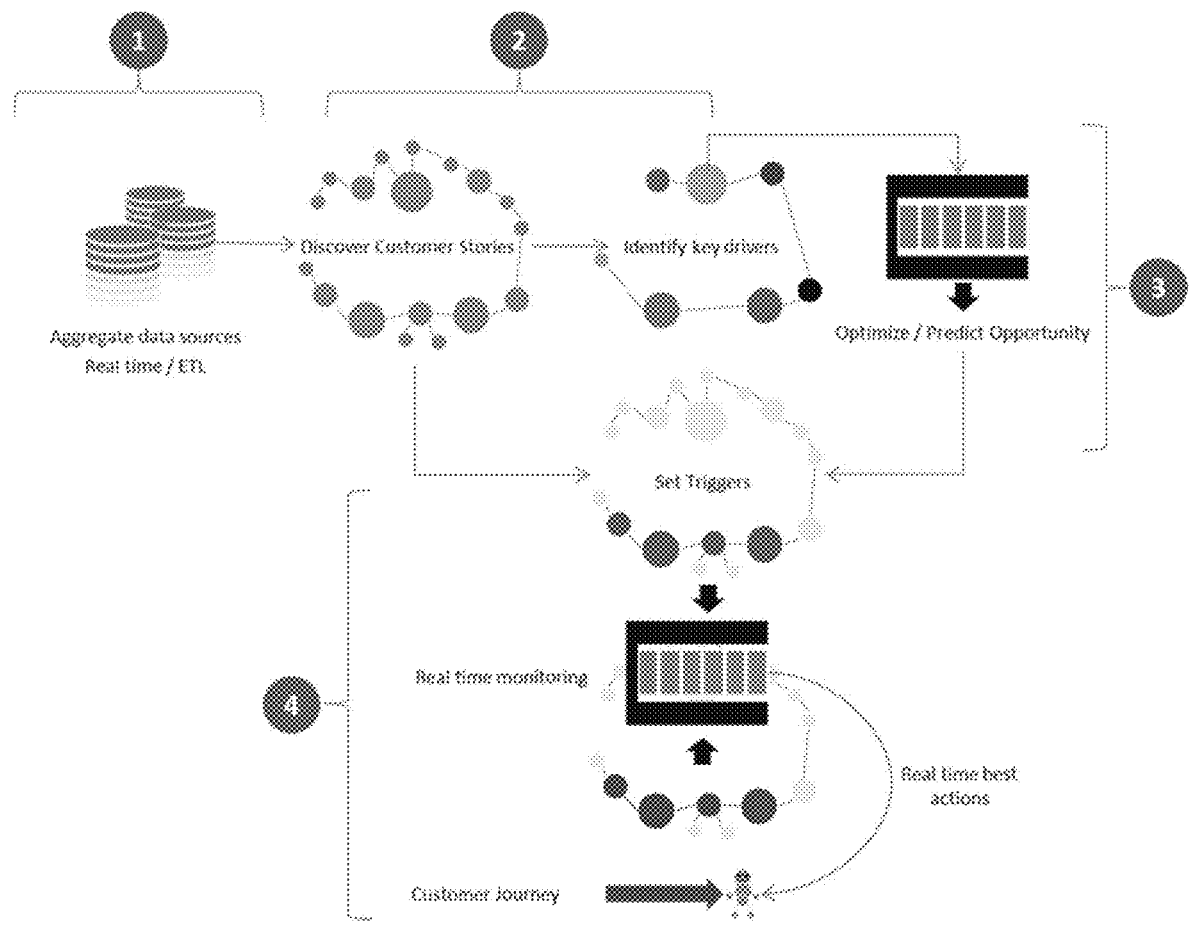
FIG. 1 is an operational flow diagram illustrating a high level overview of example operations and functions performable by the system in accordance with the present disclosure.

Conventional systems are limited to specific types of data and do not provide a solution as provided by the present disclosure. Indeed, according to techniques presently used for determining marketing effectiveness, data gathered pursuant to such campaigns generally require days and/or weeks of processing to identify the relationship between KPIs and customer experiences, identify key drivers and then to model and optimize these drivers to implement a strategy directed to a better outcome.

The system will now be described more fully hereinafter with reference to the included drawings, which are intended to be read in conjunction with this detailed description, the summary, and any preferred and/or particular embodiments specifically discussed or otherwise disclosed. This system may, however, be embodied in many different forms and should not be construed as limited to the embodiments set forth herein. Instead, these embodiments are provided by way of illustration only and so that this disclosure will be thorough, complete and will fully convey the full scope of the invention to those skilled in the art.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

In context to the embodiments of the present invention an "event" is an action occurring at a specific point of time, such as an email being sent. An "exclusion event" is a period of time relative to other events when the event excluded must not occur, such as an email not opened for a specific duration. An "event type" defines an event category and attributes expected for the event. A "label" is a type of categorical data field. A "label name" is the name of the Label. A "Value" defines a numeric field in the event. A "value name" is the name of the value. A "unit" defines the unit of the Value, such as a percentage. An "event data field" describes a label, value, and/or unit associated with an event. "Event taxonomy" describes organizing Events by category and into hierarchy. An "actor" is a person, place, or thing participant in an Event. An "actor state" is a mapping and transformation of event data field to an actor as a function of time. An "actor role" defines the role of an actor for a certain event. An "actor type" defines an Actor category and the actor states expected for the actor. A "trend" describes how an event, event data field or actor states change over time. A "dropout" is the difference between the number of actors who entered the event and the number of same Actors who entered any of the consecutive events. A "connection" is a link between two events specifying their shared actor(s) and distance in time. An "event of interest" is an event with metric that a user desires to analyze. A "story" is a pattern representing a set of events connected by common actors and their relationship in time. A "journey" is a story for a single type of actor. A "driver" is an event that positively or negatively influences a particular customer journey. "Driver intensity" is a degree of positive or negative influence on the metric per occurrence, independent of number of occurrences. "Driver impact" defines driver intensity multiplied by the number of occurrences. A "path" is a selection of a suite of events in a story or in a journey. A "trigger" is a selected Path to be monitored at the individual level and in real-time to detect comparable behavior and initiate action. A "metric" provides measurements which underline calculations of KPI(s), in turn comprised of data drawn from event data fields and actor states within a story. A "story query" is a request in specialist language which specifies metrics and story to gather from the platform data set. A "result" is the metric value return from a story query or story execution. "Filtering/grouping" defines grouping and filtering at any event or actor level filter or group all story/journey/path.

FIG. 1 shows a high-level overview of the operation and functions of one exemplary embodiment of the system detailed herein. As shown in FIG. 1, the system may be described in terms of a number of components and subsystems allowing for the operations described herein to be executed. As shown, an exemplary system may generally take a multitude of data from potentially disparate sources at (1) and aggregate the data to a form useable by the system. The system may then, at (2), provide capability for discovering customer stories and identifying key drivers though which users and the system may be able to optimize performance and predict opportunities at (3). Further, as shown at (4), the system may allow for setting triggers and alerts to provide a user instantaneous real-time opportunities to maximum sales performance based upon predictive analysis of data aggregated within the system.

In one aspect, the system may process analogous data in hours, and does not require a specialized force of analysts because of the ability of a user to build queries and subqueries using simple text searches analogous to those used with an internet search. In another aspect, a user can create a query relating to a journey of interest. For example, a user may wish to determine the incidences of customers using gift cards to make a purchase by entering the term "gift card" in a search box provided in an exemplary graphical interface. In another aspect, predefined searches may be provided by the system. For example, different types of data patterns which contain "gift card" may be provided to the user, such as "gift card issued" and "gift card used". In this way, the user may select an option, such as "gift card used," and the first sub-query would be set. The user could join this first sub-query with a second sub-query by entering "purchase" into the search box. Data patterns such as "purchase in amount of X amount greater than amount on gift card" or "purchase in amount of gift card" may also be presented. The user could select from these options to create a joined sub-query, such that journeys in which customers used a gift card to make a purchase in an amount greater than the monetary amount on the gift card would be graphically represented. The user could then quickly and intuitively identify through a visualization tool what other variables influenced the customers' actions to help increase such activity in the future. For example, the system may generate a separate graphic indicating the other events occurred during the customer journey, and at what time along the journey such events occurred prior to the result queried. The system may also graphically show (in the form of varying line colors or thicknesses for example) the path taken by most actors for the specific story sought by the user. That is, the user may understand through a quick glance at the graphic representation provided by the system that the majority of users that used a gift card above its value to make a purchase at a company's stores had previously received an email coupon, while a minority had previously received a mobile coupon—such information being conveyed by a thicker line extending through the email coupon event as opposed to a thinner line extending through the mobile coupon event.

The system can be employed in various suitable environments. For example, the system may be employed in consumer marketing, particularly following a customer's journey, including tracking customer interactions, engagement, retention, loss, and reactivation. However, the data structure and processing methods may be used in any industrial application where it is desirable to collect data and use it for modeling and optimization. Such applications may include, but are in no way limited to, the healthcare, manufacturing, human resources, education, hospitality, bioengineering, and social services industries.

The system will now be described more fully hereinafter with reference to the included drawings, which are intended to be read in conjunction with this detailed description, the summary, and any preferred and/or particular embodiments specifically discussed or otherwise disclosed. This system may, however, be embodied in many different forms and should not be construed as limited to the embodiments set forth herein. Instead, these embodiments are provided by way of illustration only and so that this disclosure will be thorough, complete and will fully convey the full scope of the invention to those skilled in the art.

Further disclosed herein are components that can be used to perform the disclosed system and method. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all system and method. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the system and methods described herein may take the form of an entirely hardware embodiment, an entirely software embodiment, or an embodiment combining software and hardware aspects. Furthermore, the system and method may take the form of a computer program product on a computer-readable storage medium having computer-readable program instructions (e.g., computer software) embodied in the storage medium (see also FIG. 44, below). In an aspect, the system and method may take the form of hardware configured to perform specific steps (e.g., microcontrollers). More particularly, the present system and method may take the form of web-implemented computer software. Centrally located servers, remote located servers, or cloud services may implement embodiments of the present system and method. Any suitable computer-readable storage medium may be utilized including hard disks, CD-ROMs, optical storage devices, or magnetic storage devices.

Embodiments of the system and method are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, computers and components found in cloud services, or other programmable data processing apparatus to produce a machine, such that the instructions which execute on the computer or other programmable data processing apparatus create a means for implementing the functions specified in the flowchart block or blocks. In an aspect, the computer program instructions may be loaded on a special purpose computer or server to carry out the functions and methods described below.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The systems and methods introduced above, and discussed in further detail below, have been and will be described as comprised of units. One skilled in the art will appreciate that the units are a functional description and that software, hardware, or a combination of software and hardware may perform respective functions. In one exemplary aspect, the units can comprise a computer. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

In an aspect, the present system and method can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, cloud services, mobile devices (e.g., smart phones, tablets, and the like) and multiprocessor systems. Additional examples comprise set top boxes, programmable consumer electronics, network PCs, minicomputers, mainframe computers, enterprise servers, distributed computing environments that comprise any of the above systems or devices, and the like.

The processing of the disclosed system and method can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

In exemplary embodiments, timestamps associated with data or metrics such as events, actors, stories, and journeys may be collected and stored. In certain embodiments, all entries may be defined by a corresponding timestamp to allow data to be processed, analyzed, and visualized as it relates in time to other timestamps and associated data. Because each entry of the data structure can be defined by a timestamp and as all data related to the timestamp can be maintained in a timestamp format, the disclosure provides for a system, which in certain embodiments, collects data across all available data channels and preserves the integrity of all data associated with an actor; this is contrast to conventional data formats and databases, in which collected data is forced into structures that require loss of potentially meaningful metadata.

In another implementation of an exemplary system, disparate (and related) sources of data may be automatically gathered through batch or streaming inputs to a database associated with the system. The system and database may be stored in either a local server or in a remote configuration, effecting a "cloud" based system, or any suitable combination therebetween. That is, certain embodiments are not limited to a specific storage solution or environment.

Example sources of raw or pre-processed information, which can be received by the system, include: email data; social media data (e.g., feeds from Facebook, LinkedIn, Twitter, etc.); promotional material (e.g., electronic coupons); call center data; customer relationship management (CRM) data; mobile marketing data; operational data (e.g., revenue, sales reports, etc.); and point-of-sale data (e.g., forms of payment, customer identity, etc.). However, in certain embodiments the system is not intended to be limited to a specific type of data. Instead, the system can take data used and tracked by companies in disparate and/or related systems and aggregate/store this data in a format that allows efficient retrieval, analysis, and representation by the system. As further described herein, data may be related through events, connections, actors, and stories. For example, the system may relate data by creating a timestamp and type for each event and associate it with an actor or actors.

As referenced above, an event is an action or observation occurring at a point in time related to at least one actor, and an event data point may consist of at least a timestamp, an event type, and at least one actor. An event data point may also include other attributes such as categorical, numeric, geographic, and unstructured data. Events may share actors. An actor is a person, place, or thing that participates in an event. Connections relate two events to each other by specifying shared actors and relative position in time. A story is a pattern representing two or more events related via shared connections. The system may present a story visually through a story graph in which the nodes of the graph generally represent events and the edges generally represent connections. Journeys, which comprise one or more stories related to particular types of actors, can be graphically presented by the system in a form that allow an intuitive understanding of what events, event attributes, and event sequences most influence actors' outcomes so that future interactions can be optimized. The system may also graphically represent future actions to optimize performance.

Figure 2:
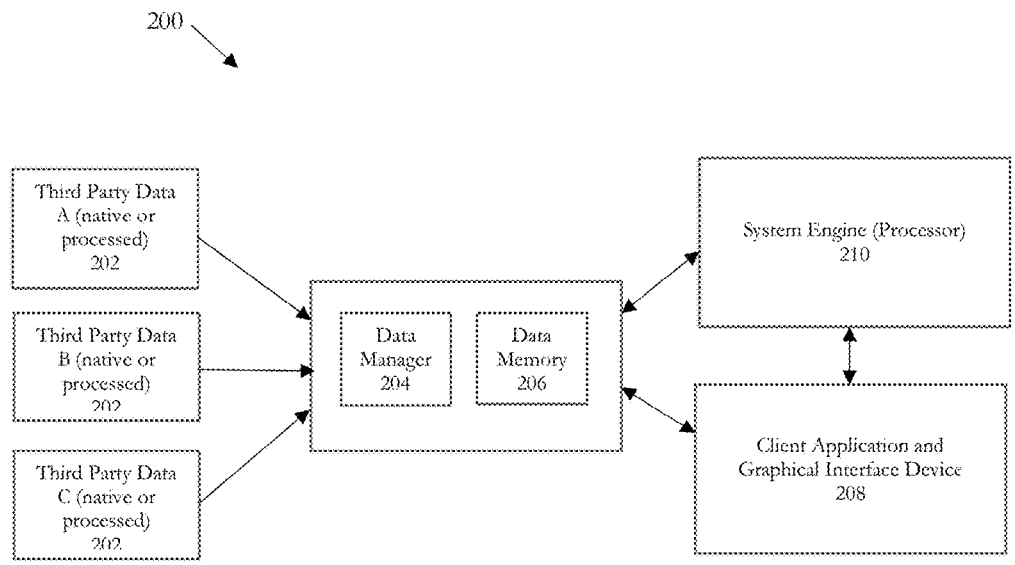
FIG. 2 is a block diagram illustrating an overview of an example system in accordance with the present disclosure.

Referring now to FIG. 2, a block diagram overview of a system 200 according to one or more exemplary implementation provided. As noted herein, the system may be provided as a software as a service (SaaS) model through a cloud-based database structure. However, other embodiments may include localized whole or partial data storage. Additionally, the precise location of processors and computers implementing the system may vary by embodiments. In some embodiments, the entire system may reside remote to the end user (except for the client service device where a graphical interface is provided—e.g., mobile phone, computer, etc.), while in other embodiments, the entire system may reside local to the user. As such, the precise location of the components of the system may not necessarily be critical to an understanding of the application of the functions of the disclosed inventive system.

As provided in FIG. 2, in certain embodiments the system 200 may receive data from one or more sources 202. This may be done through a batch transfer of past events or real-time as provided herein. A data manager 204 may take the data, which can be in a variety of disparate formats, and prepare the data to be used by the system as described herein. For example, the data may be formatted to interrelate details such as the time of an event, the type of an event, the subject of an event, and/or an actor performing an event. In at least one embodiment, the data is formatted to interrelate with other data at least through a timestamp and identification of the event to which the data relates. The data may then be stored in data memory 206 for efficient retrieval by the system upon the execution of a query.

Once the data is formatted or translated into a useable format (or stored according to the system requirements), it may then be used by the system to provide instantaneous or near-instantaneous feedback to a user, such as a marketing officer of a company. To do so, a client application 208 may be provided on a third party client device, such as a personal computer or mobile device (e.g., phone or tablet), which can interact with both the data manager and the system engine. The client device may further provide a graphical interface through which a user may interact with the system. In some embodiments, this interaction may involve a user selecting specific pre-set queries provided by the system or building additional queries based on options provided by the system (as described herein). Upon execution of a query, the client application 208 may provide information and requests to the data manager 204 and/or the system engine 210. For example, through the client application 208, a user may request to see a set of events within a specific time period that affect product or service sales over the same time period. The client application 208 can then request that the system perform the requested query and deliver the requested information, which can be provided in an intuitive graphical interface as provided herein. This may be done by sending the query directly to the system engine 210. The system engine 210, in turn, may build and run the query (performing a set of logical operations on the available data) by interacting directly with the data manager 204 and/or data memory 206 to return usable results to the client application. In addition, the client application 208 may also request and retrieve information directly from the data manager 204 and/or data memory 208, which can be likewise be provided to the user through the graphical interface.

As such, the system is capable of providing an easy-to-understand graphical interpretation of the data to relate events, actors, and stories to one another, thus providing feedback instrumental to users of the system.

Figure 3:
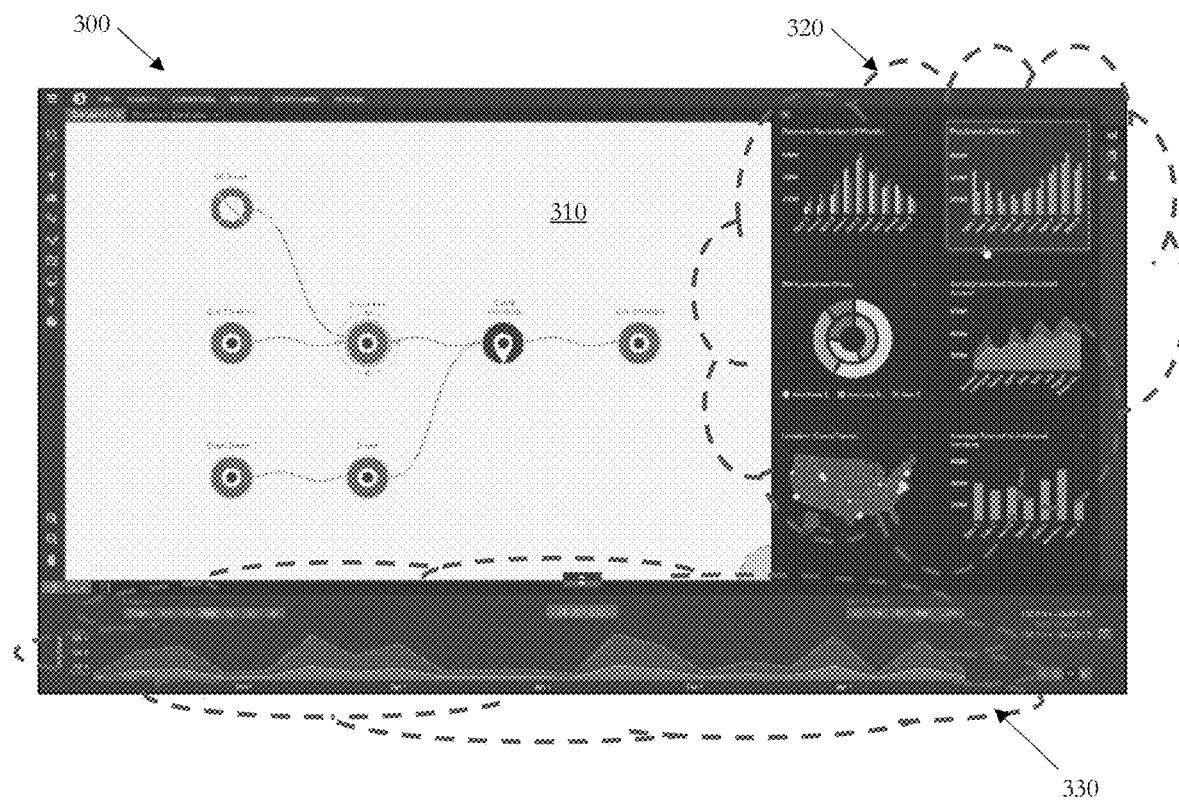
FIG. 3 illustrates an example graphical user interface in accordance with the present disclosure.

FIG. 3 illustrates an exemplary graphical interface 300 that may be provided by the system according to one or more of the exemplary embodiments described herein. In particular, an exemplary story 310—with specific events and actors selected—is shown. As described herein, the graphical interface 300 may provide a modelling area 310 from which stories may be created and analyzed in near real-time and from disparate data sources. Information gathered by the system may be assessed and analyzed through this graphical interface 300. The graphical interface 300 may further provide interpretive data in charts in a counterpart area 320. Examples of information that may be shown in counterpart area 320 include, for example, bar, pie, line, and scatter plots as well as map overlays, Sankey diagrams, and infographics. Further, incidences of events based on the selected modelling may be provided by the system in a timeline area 330 of the system graphical interface 300. For example, the timeline may show the distribution of the story over the time (when and how many times the complete story happened). The user can focus on a specific period by selecting a specific start and end date and the area 320 can be automatically refreshed by the system based on this new period.

By way of example only, the systems described herein may be used through an application operating on a client device (such as a personal computer) by a user (such as a Chief Marketing Officer (CMO)) who can visualize a customer journey by intuitively selecting events and assimilating stories via the application to quickly and in the aggregate determine, for example, what marketing activities (e.g., email communications, text messages, or other direct marketing plans) result in a customer visiting a store and making a purchase online and in what monetary amount. In an aspect, a CMO can, through the graphical interface 300, quickly assemble a query based on events through which the system can inform him or her how many first-time customers were enticed to visit a specific location based on a coupon emailed to the first-time customer as part of a specific third-party marketing plan. That is, the system may present directly to the user (through line thicknesses, graphs, or otherwise) the number of actors who took a specified journey, contributed to the outcome, or left the journey at any point of time based on specific events.

As previously outlined, the system may graphically produce information in the form of an intuitive "story." The story presented can take the form of a graph visualization in which the nodes of the graph represent events, and edges represent shared "actors" in each event as well as the events' relationship in time (e.g. event A follows event B within 30 minutes). A story graph which is composed of events and actors lays out a literal, "human-readable," story that occurred in real life over time. Stories may contain branches representing alternative journeys which converge upon, or diverge from, each other. An "event" is a discrete data point analogous to a row in a database. In certain embodiments, every event is required to have a timestamp, a specified type (e.g., a "login" or "purchase"), and at least one actor (see below). Although events can be used to represent recorded customer actions, they can also be used to represent changes to static data like updating or creating an address record or assigning demographic or segmentation data. In certain embodiments, events need not be associated with a customer. For instance, changing a product price or placing a procurement order could also be events. In certain embodiments, events do not contain direct references to other events, but instead can share common actors which indirectly link them together. As indicated above, "actors" are people, places, or things that participate in an event. For example, for an event of type "purchase," actors may include a customer, a store, an employee, and multiple product actors. Actors can be used by the system in a manner similar to how foreign keys are used in a relational database. In certain embodiments, the actors are used as "keys" in conjunction with timestamps to denote relationships between events.

In certain embodiments, nodes of the story graph represent patterns to filter events. That is, nodes in the story graph do not represent individual events (i.e., data points) per se. Nodes and edges represent patterns which are used together to find matching occurrences in a dataset and enable aggregation of similar patterns of events and actors. For example, if one were to write a story that recites, for example, "the play opens, hero falls in love, hero's love dies and/or hero dies, the end" and if one were to run the story as a query to aggregate all matching occurrences in a corpus of 16th century dramas, the result story graph could be presented by the system using nodes and edges.

In certain embodiments, each individual node in the story graph specifies a respective filter for events in the data pool. These filters include an event type and optionally include bounds on the timestamp and constraints upon the parameters of the event. For instance, a node might represent a filter which finds purchase events paid for by credit card in May 2014 with a value of over $22.

Similarly, in certain embodiments, edges in a story graph specify the relationships between nodes—specifically, shared actors and a relationship in time between two event patterns (nodes). This is analogous to a "join-on" clause in a SQL statement where two sets of data points are joined using common foreign keys. A story query may contain many such connections joining many event patterns and, as a whole, representing a conjoined logical statement.

There are a variety of types of relationships that two events can have in time, for example: event A is before or after event B; event A is within a certain amount of time before and/or after event B; event A is the most recent event before event B, or A most closely follows event B; and event A is within n events of event B.

In certain embodiments, when a user assembles a story in the user interface, a query can be run via the analytics system to collect aggregated information for all of the events and actors in the story in accordance with specified filters and "join" criteria. The user can then use the system to interact with nodes (sets of events) and edges (sets of actors) to view statistics across the data fields associated with those objects. This allows for presentation similar to "cube" or "slice and dice" paradigms, except one accesses the dataset of interest by clicking on an event or actor (node or edge) in the story graph, and the data viewed by the user has already been filtered to include only customer journeys which match the story.

As foreign keys, actors do not necessarily have data inherently associated with them. They are, at the base level, simply unique text strings which serve to link events. However, it may be useful for a user to build stories with constraints on the actors involved, at least conceptually. If a user wished to look at stories for actors that are only of type "customer" and who have a premium subscription, the user can implement this criterion in a raw query by adding an event containing the "subscription type" label to their story (for example, an event called "customer signup") and then apply a filter to limit events to only those with the "subscription type" label of "premium."

The "actor states" may provide a shortcut to filter and analyze actors by directly associating event data to actors, eliminating the need to explicitly add events to the story purely for the intent of filtering actors. A data administrator can specify such mappings in an admin console or configuration file.

For the example above, the data administrator may specify that the "subscription type" state of an actor is equal to the "subscription type" label of the most recent associated "customer signup" event as of a given time. Note that a time relationship has been specified. If a customer changes their subscription type, their state will be updated. A feature of the actor state is its dynamic nature. The same query can be used to match journey segments both before and after the subscription upgrade/downgrade, and in each case the analysis will consider the state of the customer at that time. This is quite challenging, and potentially inefficient to implement in a typical database.

The system may utilize actor states quite different than common practice. Specifically, the traditional system may create a database table of customer states (called a "dim" or "dimension" table and often called "DIM_CUSTOMERS"). This table typically does not fully account for the dynamic nature of customer states and merely maintains a record of the most recent state or snapshots of customer states on a regular time interval in at least the manner provided herein. Further, the calculation of actor states can extend beyond simply "linking" a single data field of an event to an actor.

In certain embodiments, the system may merge data fields from multiple event types into a single actor state. For example, a "segment" state of a Customer actor may draw from both the "cust_seg" field of "an account_creation" event or the "segment" field of a "customer_data" event—choosing whichever event of those two types is the most recent. In certain embodiments, the system may perform logical or mathematical transformations of event data. For example, categorical data fields may be "grouped" to reduce the dimensionality or numeric data fields may be arithmetically combined. In certain embodiments, the system may aggregate data fields over time. For example, an actor state called "90 day value" may be the sum, over the prior 90 days, of the "total_amount" field in the purchase event. Time-series functions such as this are often difficult to apply in most existing business analytics and business intelligence (BI) tools. In certain embodiments, the system may apply predictive models to filter or group actors by predicted behavior.

Further details disclosing functions/operations of exemplary systems are provided below. It is noted that the descriptions provide specific implementations of systems that may be modified by one of ordinary skill in the art to provide similar functionality without departing from the spirit and scope of the systems disclosed herein.

Exemplary Driver Detection

"Driver detection" in analytics generally refers to the task of identifying events, event attributes, and/or actor states which are predictive of actor behavior driving to a business outcome. The systems disclosed herein provide an analytics platform that invokes a powerful set of proprietary algorithms to examine a uniquely rich dataset. It also enables an innovative user experience for asking complex analytics questions and viewing and interpreting output, as well as proposing insights to the user without the user specifying a certain data query.

1. Specifying Analytics Tasks

The system's creation paradigm enables users to intuitively express complex questions and communicate these queries to the analytics platform. For example, a user can express a customer behavior of interest, whether a desirable behavior or an undesirable behavior, of any degree of complexity, and submit that story to the analytics platform to examine what preceding behavior factors increase (and decrease) the likelihood of that behavior.

In certain embodiments, a user can create a "branched" story with multiple alternative journeys and command the analytics platform to find what factors are predictive of which branch/journey an actor will follow.

2. Viewing Analytics Output

Drivers themselves are events, event attributes, or actor states. As such, they can be represented by the system through the same story visualization paradigm used for framing story queries. This enables a powerful means of visualizing analytics output for driver identification; the events representing drivers can be "stitched together" into stories showing "good" customer behavior and "bad" customer behavior. Driver events can also be inserted into other stories to drill into the journeys of customers exhibiting a higher propensity for behaviors of interest.

Exemplary Query Building Using Pattern Search

As discussed above, the story graph may operate through a query on a database. In certain embodiments, this query is made up of sub-queries (nodes specifying filtered sets of events) and joins (actors and a relationship in time). Because the sub-query/join metaphor is familiar to data professionals, this section will use that terminology instead of node/edge.

An analyst using a data warehouse or any other database of modest complexity may obtain a large amount of knowledge in order to, first, find the data they're looking for, and second, join that data with other related datasets to produce the desired view. Building a story requires "stitching together" many such sub-queries and joins.

To facilitate this process, the system incorporates search functionality which uses familiar text search metaphor to automatically produce sub-queries and facilitate joins. The below is an example of one such scenario.

1. Search Results Show Matching Patterns

The system may have a search bar to aid users in building their desired sub-query. If a user wanted to find all "purchase" events where a gift card was used for payment, they might enter "gift card" into the search box for example. The search would return different types of data patterns which match the entered test. In this instance the user might see results like the following:

The event is of type "gift card issued"

The event is of type "promotion" and the "category" label contains "$5 gift card"

The event is of type "purchase" and has a "gift card used" label

The event is of type "product procurement" and the "product id" actor has been given meta data by the data admin reading "note: if the product is a gift card then the product id corresponds with the card art design"

The user may then select one of the types of data patterns. In this example, the user selects the third option.

2. Users can Extend Pattern

At this point the user could set the "gift card used" filter in the "purchase" query to "true." The user can also add other constraints to this sub-query—specifying other filters for labels or values.

3. Suggested Patterns can be Added to the Query

When the sub-query has been defined, the user can add it to their story and return to the search bar to build a new sub-query (i.e. adding more events to the story). If a user is adding a sub-query to an existing story that already contains at least one other sub-query, the user will have to specify how to join these two datasets.

4. System Provides Recommendations for how to Add to the Query

When a user seeks to introduces a new sub-query into a story, the user will first designate which existing sub-query they would like to join to. The system is then able to provide recommendations for how to craft this join in the interest of reducing the amount of knowledge required to perform useful analysis.

The system has statistics on how often different event types share common actors, the nature of those actors, and the typical chronological relationships between connected events. Using this information, the system can make suggestions, ordered by relevance, for which actors, and what relationship in time, to use to join two sub-queries.

If desired, the user can select one of the suggested joins and have it automatically applied. Alternatively, the user can modify one of the join suggestions to match their needs, or create entirely new, un-suggested join criteria.

Over time, the system will learn which joins are preferred for different contexts, and then suggestions and their ranking will be calibrated based on the feedback of relevance to the user. Some examples of the mechanism that the system employs to learn and calibrate include, but are not limited to: intrinsic measurement and interpretation of user interactions such as clicks, views, and object history; and explicit user input specifying preference or priority of items. These and other techniques can be applied independently or collectively to optimize the user experience.

5. Results can be Filtered by Existing Query

Once a user has a story composed of a number of sub-queries and joins, the user may find it irrelevant to view any search results which cannot be directly joined with the existing story. The user has the option of filtering search results to view only sub-queries which share common actors with sub-queries in the existing story—and can hence be directly joined with the story using these shared actors.

Exemplary Path Archetype Exploration

Because some users are not interested in creating or viewing stories having more than 10 or 15 nodes, the system may address one or more of the following challenges. If 1,000,000 actors create series of events (journeys), all 1,000,000 journeys will be unique when all event attributes and the time between events are taken into account even in the exact same context (for instance, customers on a website). Thus a way of summarizing actor journeys in a manner which presents only the most salient information to the user and masks redundant behavior or overly complex patterns is needed. In certain embodiments, the system addresses this concern by presenting the user with sparse approximations intended to represent the most informative aspects of the full set of actor journeys. However, the user may desire additional detail or precision for specific components of a journey. In certain embodiments where additional detail or precision is requested, the system may present the users with a drill down tool which allows the user to visually "drill down" into components of a journey which interest them for more information.

Accordingly, the system may use journey "archetypes" to overcome these issues—which are approximations of journeys, represented to the user as a kind of "average" journey, intended to represent that chain of events in a manner that can preserve the most defining characteristics of a set of similar journeys, reduce the size of the presented information to the minimum necessary to understand the commonality among a set of journey, and distinguish one set of journeys from another. To recap, a story query is used to generate a set of individual journeys matching the specified pattern, filtered from the overall dataset. These journeys include events linked by common actors and their relationships in time.

One technical challenging that the systems disclosed herein can address is how to represent a set of unique journeys to the user in a manner which enables them to understand the essential nature of the entire set. In certain embodiments, the system addresses this challenge by clustering journeys based on similarity using a path clustering algorithm. Specifically, the path clustering algorithm may, for example, group like journeys based on commonality of event sequence, event timing, and/or event attributes. This algorithm also reveals the defining characteristics of each journey (e.g., customers in journey A put multiple items in their cart and customers in journey B were "just browsing"). Each of these clusters and their defining characteristic defines an archetype. The system can then present these archetypes to the user in a form which is visually identical to a story—enabling the user to rapidly understand the different types of journeys taken by customers and both their similar and distinguishing characteristics.

In certain embodiments, when a story is defined, whether by the user or in an automated fashion, the system may enable the user to have the platform discover the journey archetypes occurring before or after the story. This is analogous to asking "what typically happens before the story I've defined" or "what happens after this story." This functionality provides the user with insight as to potential causal relationships between events and enables identification of common events where the user may be able to influence or measure an actor's journey. The user may also have the system discover journey archetypes which typically occur between two events in a story. For instance, a user may want to know "what typically happens between a call center agent picking up the phone and the end of that call."

Similar to story filtering, the user can filter archetypes based on properties of actors or events. For instance, a user may want to understand only the journeys taken by a certain customer segment. Again, as with other stories, the user can perform BI operations on archetypes meaning, among other things, that they can inquire into the differences between the states of actors who take each archetypical journey.

Because archetypes are approximations, they significantly reduce the detail of the original journeys as a trade-off to aid the user in understanding the underlying data. The platform disclosed herein may enable the user to adjust this trade off to discover and view archetypes with different levels of detail. For instance, one user may only be interested in the one or two defining characteristics of each archetype, while another may be interested in understanding a more thorough history of events across a greater number of archetypes.

An alternative or additional process for increasing detail is by invoking a more targeted drill-down into an archetype. For example, a user can identify a sub-journey of any archetype and have the system discover sub-archetypes—which archetypical journeys taken between the defined events within another archetype. This enables exposure of a virtually infinite level of journey detail without overwhelming the user with data or interaction complexity. Archetypes may also have some labeling to highlight their important, defining differences.

Exemplary Metric Representation to/from Events

One business application of data, even "big data," remains the crafting of relatively simple aggregations to inform decisions and track performance. Examples of such output are KPIs such as weekly sales, monthly attrition, and website visits. Such aggregations—when data is aggregated to single measurements optionally grouped by categories and date ranges—are referred to herein as metrics. "KPIs" are a special subset of such metrics considered especially important by an organization for tracking and reporting performance.

Metrics themselves are not the "root cause" of business performance. Behind every metric there can be a set of customer journeys. A single metric is simply an aggregation of small measurements taken at one or two events of that journey.

Thus unlike prior systems, users of the system disclosed herein can drill into metrics to view the underlying journeys, and thereby diagnose root causes, design treatments, and uncover opportunities.

1. Metrics can be Defined from a Pattern of Events

Definition of a metric or set of metrics begins with a story. A story can be interpreted as a "virtual relational database" of sorts, where the events/nodes in the story are analogous to tables and the actors/edges are analogous to foreign keys and joins.

Metrics are defined by creating a query on top of a story in a similar fashion to how one would develop metrics off of a relational database. This meta-query may involve a graphical interface, or could utilize a query language similar in syntax to conventional SQL.

Creating metrics from stories may have several advantages. For example, the "hard part" of locating the necessary data, joining data tables, applying filters, and inspecting output is handled by the story creation. The ability to associate states with actors also dramatically reduces the complexity of certain types of queries. After the story, the meta-query uses this pre-filtered, pre-joined data to define the variables of interest and the math by which to perform calculations and aggregations. Moreover, users can refer back to the originating story to better understand the metric (more on this below).

2. Other Metrics can be Defined from Metrics

Metrics aggregate measurements from stories into simple numeric output. These outputs can be assembled into visualizations or can be used as inputs for additional calculations to derive new metrics. Ultimately, any metric can be designated as a KPI and published as a visualization via a user dashboard or workspace.

3. User can View Originating Pattern of Events by "Drilling" into Metric

Business intelligence frameworks today often provide means to "drill down" into metrics to view the displayed data in more detail. This typically means increasing time resolution for time-based charts or filtering, grouping, or segmenting bar charts.

The system disclosed herein provides this same functionality while enabling users to dive further into the data by viewing the originating story for the metric. From here, users can explore events in the customer journey which led up to the point where the metric was measured—providing a unique way to view, uncover, and understand potential root causes and opportunities.

4. If a Metric is Backed by Other Metrics, a User can View Those Metrics by "Drilling Into" the First If a metric is created by performing calculations upon other metrics, the user will be able to view the underlying metrics as a form of drill down. For instance, a "total sales" metric could be a sum of metrics measuring sales originating from three different parts of the business represented by three distinct stories.

Exemplary Story Query

Disclosed below is an exemplary query format optimized for the types of operations performed by our system.

It is noted that, in alternative or optional embodiments, machine learning may anticipate the types of journeys in which the user is most interested, and suggest influential queries and conduct modeling based on the KPIs resulting from the visualization of these queries. In an aspect, the system enables data to be processed more quickly, thereby: (a) improving the overall functioning of the machine because data is related in time rather than stored as data points in tables; and (2) expanding the types of analyses available. In an aspect, through use of the system, users do not need sophisticated analysts to identify important aspects of an event, actor, or story to analyze data and create modeling to optimize future interactions.

Referring now to FIG. 4, a sample query format is provided for illustrative purposes. As shown, the sample story query includes three core components: metrics, story, and timeframe. The metrics draw data from the story as numeric aggregations and calculations, and provides the ability to reuse metrics in the definition of other metrics. The story specifies the events, actors, and their respective relationships from which to draw metrics. The story also enables filtering and grouping to further hone the output. All events and actors are assigned names for reference in the metrics section. The timeframe constrains the query to a specified time bound and timing grouping.

1. Exemplary Timeframe—Lines 19, 20, 28

A unique aspect of the system is that all data is in the event and therefore has a timestamp by nature. For this reason, timeframe may be separated from the rest of the query. The timeframe section performs two roles: providing time bounds on the query and designating the time duration by which to group the output (e.g. daily, weekly, monthly, etc.).

By default, the timeframe will be applied to the event time of all events (i.e. only stories with all events occurring in the designated timeframe will be selected). However, the power of the timeframe clause is that it effectively sets a variable which may be reused throughout the rest of the query. In the example above, the "email" event has been filtered to only include events which fall within the timeframe. There will be more on the event specification later, but in the meantime note that the default behavior of the timeframe filter is overridden when timeframe is assigned to a particular event. In this example the other events are not filtered on timeframe and are instead constrained by their specified indirect chronological relationships with the "email" event via the "sale" event.

Pulling timeframe designation out of the realm of a general filter and into a top-level specification provides a single well-defined point of interface for both analysts and applications to manipulate this essential query component.

2. Exemplary Story Structure—Lines 21-57

The story is made up of three components: events, actors, and an optional logic qualifier. The events section essentially creates a collection of unconnected data points representing the raw building blocks of a story. These would represent the nodes on a story graph visualization. Once the events are specified, the actors section designates connections between these events in terms of common actors and relationships in time—representing the edges on a story visualization. Finally, the optional logic section provides the ability to modify how the story is interpreted.

3. Exemplary Event Specification—Lines 22-38

Events are the fundamental building blocks of a story but will rarely represent a story on their own. However, to simplify the process of story creation it is convenient to collect, filter, and group them without regard to their respective relationships. The only required field for an event is the event type which specifies a filter applied upon the event type field of the event data format. Users can optionally specify an event time which imposes absolute time bounds on the event. As noted above, the event time constraints of all events in the query will default to the timeframe unless the timeframe is explicitly associated by the user with the event time property of at least one event.

4. Exemplary Event Filters and Grouping—Lines 25, 29-34

Events can be filtered on both labels (lines 29-31) and values (line 25). In these cases, the "key" (in the key-value-pair sense of the word) of the parameter (the text before the colon) designates the field in the event data upon which to apply the filter. The "value" of the parameter (the part after the colon) defines the criteria for the filter. Note that values (in the label/value sense of the word) are filtered using comparators (=, >, <, >=, <=, between/and) and labels are filtered using lists of patterns against which to compare the label value text.

Events can also be grouped using criteria applied against labels and values (lines 32-33). Note that unlike traditional databases, groups on the system may be assigned names for later reference in the metrics definition section. Line 33 defines a set of groups collectively called "campaigns" which differ in their "campaign name" label field (which in turn has already been filtered on lines 29-31 to only include events with the campaign names "member discount" and "the big * sale," so the number of groups in the "campaigns" group set will be 1+the number of different campaigns matched by "the big [wildcard] sale").

5. Exemplary Event Selection—not Shown in Example Code

By default, if there are many events of a given event type matching the filtering and connection constraints in the same story, the event which occurs latest in time will be selected. This is purely for performance optimization reasons. However, there are instances where a user may want to change this constraint, and there are further cases where a user may want to select all matching events and aggregate them in the metrics section.

To specify the event selection criteria, one or more of options may be used preceded by a "select:" keyword. In certain embodiments, the options include one or more of: closest, furthest, earliest, latest (default), or all (requires an inner aggregation in the metrics definition—described later)

6. Exemplary Root Event—Line 29

Counting stories without employing a starting reference point may be difficult as many combinations of stories may match the same criteria for the same actor. To solve this problem, in certain embodiments, one and only one event is designated as the "root." Other events may be used in different story matches for the same actor, but this event will be unique to each story match. Note that line 29 simply reads "root:" without anything after the colon. This is sufficient to specify that the event is the root.

The root event also resolves the ambiguity of which timestamp to use as the reference for groupings and aggregations in the metrics definition. For instance, line 20 specifies that metrics will be aggregated "by: day." The root event provides the timestamp for this grouping.

7. Exemplary Actor Specification—Lines 40-44

As previously defined, actors are one of the essential components of the connections between events in a story graph—the second component being relationship in time, which is defined in the "connections" section. Every actor must specify at least one property: the actor type (e.g. account).

Note that actors do not have any notion of absolute position in time, i.e. there is no "actor time" field like there is for events. Actors have a similar structure to events in terms of filtering and grouping, but can include an added feature for grouping like described below.

8. Exemplary Actor Filters and Grouping—Lines 42-44

Recall that although actors cannot explicitly contain data (they are simply foreign keys on which to link events), actors can be assigned "states" which are mappings of event data effectively functioning as shortcuts to access the results of more complicated story analyses. In certain embodiments, filters may be applied to actor states in an identical fashion to how filters are applied to event fields. Grouping of actors can be performed similar to that of events.

9. Exemplary Connections—Lines 45-55

Connections bring events together into a story by linking events through their relationship in time and through shared actors. As such, each connection defines both of these properties using the actor and relation parameters.

Figure 5:
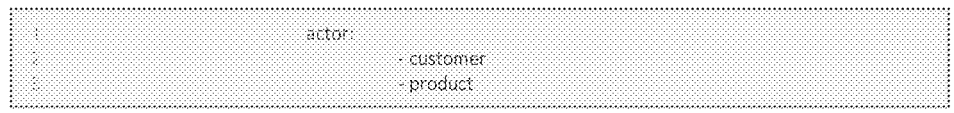
FIG. 5 illustrates another example query format in accordance with the present disclosure.

The actor parameter (lines 47, 50, and 53) associates the connection with an actor defined in the actors section mentioned above. Multiple actors can be part of the same connection, in which case the actor parameter might look like what is shown in FIG. 5. Relations (lines 48, 51, and 55) define the relative position of two events in time—simultaneously defining both the events and their relationship in the same phrase. As such, the relation clause typically includes the names of two events (as defined in the "events" section) and some relationship in time (e.g. website precedes sale by <1 hour). The following examples of time relationships are all valid (with "A" and "B" representing event names and "[ ]" representing optional criteria):

A precedes B by (< or >) 10 hours [and >2 minutes]
A follows B by (< or >) 10 hours [and >2 minutes]
A precedes B by (< or >) 10 hours or follows by (< or >) 1 hour
A precedes B in last event
A precedes B in last 3 events
A follows B in next event
A follows B in next 3 events
A precedes B
A follows B
A The final case above is an exception to the general pattern for events. In this case the user is associating an actor with a single event in order to do one or more of three things: filter out stories where this actor type has not been specified for this event, filter out stories for criteria applied to actor states (described in the next section), and/or group output based on the states of this actor or the presence/lack of this actor (also described later).

If relations are defined in the groups clause for an actor, as described below, they need not be defined with a relation clause.

10. Exemplary Actor Filters and Grouping—Lines 48-52

Recall that although actors cannot explicitly contain data (they are simply foreign keys on which to link events), actors can be given "states" which are mappings of event data effectively functioning as shortcuts to access the results of more complicated story analyses. Filters may be applied to actor states in an identical fashion to how filters are applied to event fields.

Grouping functionality for actors is also identical to that of events with one extension. Because actors can also specify time relationships, it may make sense in some queries to group on the presence or absence of this relation. In the sample code, the user is creating two groups in the "received email" grouping (line 52)—one who did receive an email with 10 days of a sale event, and another which did not. This distinction, as well as the resulting inclusion of the group which did not receive an email, can be useful for metric creation, for example, when users performs analysis on campaign effectiveness.

11. Exemplary Story Logic—Lines 54-55

By default, the system identifies stories where all of the actor relationships have been met (except for actors where a relation is specified in a group clause, as in line 52). This logic can be altered to include disjoint ("or") logic. For example, line 55 in the sample code specifies that story matches must include either the "from web" actor relationship or the "from mobile" actor relationship.

12. Exemplary Metric Structure—Lines 1-18

Metrics can be analogous to select statements in a SQL query in that they designate both the data to be output from the query and the transformations to be performed upon that data. Each metric uses references to the named actors, events, groups, and other metrics to define its data sources and output.

A metric definition may include a reference to a field in an event (lines 3 and 4), a reference to only an event (line 7), and various aggregations and transformations.

13. Exemplary Metric Transformations—Lines 10, 12, 15, and 18

There are two types of transformations: arithmetic/logical operations and time series operations. Arithmetic/logical operations modify data values according to simple transformations familiar to anyone who has used a relational database. This includes addition, subtraction, multiplication, and division plus the logical operation case/when/else. Time series operations are an innovative feature that greatly reduces the effort required for time series analysis. Exemplary options include:

smooth [using function] over time (e.g. "smoothed using weibull (1.1, 5) over 2 months")

delta [over time] (e.g. "delta over 1 year" for year-over-year analysis)

delta [from function] over time (e.g. "delta from trend over 2 weeks")

slope [using function] over time

Note that math clauses can refer to fields in the story or to other metrics.

14. Exemplary Metric Aggregations—Lines 5 and 8

There are two types of aggregations: conventional aggregations which combine event fields across many stories into one (lines 5 and 8, similar in nature to aggregations in a typical relational database) and "inner aggregations" which combine events of the same type within the same story (not shown in the query example above).

Simple aggregations are defined using the aggregation keyword. The format for an aggregation statement is "[aggregation type] [math]." The first component, the aggregation type, is identical to typical aggregate functions found in relational databases today. The options for aggregation type are: min, max, sum, avg (or average), count, variance, and stddev (or stddev).

The math component following the aggregation type can include any of the operations defined in the metric transformations section above. These transformations will be applied to the aggregated values, i.e. the data will first be aggregated and then the transformation will be applied. To apply transformations to the original data before aggregation a "math:" statement can be included in the metric definition.

In certain embodiments, when a user specifies "select: all" event selection criteria in a metric definition, many instances of the same event may be matched. In this case the instances of the event may be aggregated within the same story by using the "inner aggregation:" keyword followed by any valid aggregation specification (identical to "ordinary" aggregations defined above).

15. Exemplary "Hidden" Metrics—(not Shown in Example Code)

Sometimes a user may want to specify metrics simply to be used in the calculation of subsequent metrics. For example, a user may not be interested in actually showing those metrics in the output. In this case, the user may add the "hide:" keyword to metric definition (no value is necessary for this keyword).

Similarly, the user may wish to perform transformations upon the data at the event level before aggregation and may wish to keep this calculation in a separate metric instead of including it in the same metric as the aggregation itself. Such event-level metrics will be automatically (and sometimes necessarily) hidden since results must be aggregated in order to be presented.

16. Exemplary Groups Based on Metrics—(not Shown in Example Code)

In certain embodiments it may be useful to create groups based on calculations rather than the raw data itself (for instance, bucketing customers by their total annual purchase value). The user may include a "groups:" clause in the metrics section and use similar rules for group definition as used in other parts of the query employing the "groups:" clause.

Exemplary Query Formats

The sample code of FIG. 4 is in a language format that is based on the meta-language YAML. Other suitable languages can be used that are based on JSON or XML for example. In certain embodiments it may make sense to enable multiple formats, as JSON or XML may be more compatible with inter-machine communications whereas YAML or a variant may be more compatible with human readability.

As described above, the system provides an event-based data structure where entries are timestamped, either in at the granular level or in the aggregate, according to which actors' journeys are accessible through the actors' lifecycle without imposing data degradation from formatting and processing. In certain embodiments, the system transforms data stored in traditional and relational databases into a timestamped event-based data format and groups the translated data according to actors, events, or related stories. As noted, data may be provided to the system via batch methods or via real-time interfaces. In an aspect, data may be streamed directly to the system in the event-based format—or translated to the event-based format upon being received by the system.

A further aspect of the system provides for interaction with and visualization of the data. The system provides for a query structure through which users can identify how events are connected to other events in time and with respect to shared actors. In an aspect, journeys, defined by stories filtered according to a particular type of actor can be visualized in relation to a root event. The root event serves to apply chronological ordering to all additional events contributing to the particular journey. In an aspect, metrics are drawn from stories as calculations made with respect to a set of events and the occurrence or attributes of each event. For example, where a story comprises events representing receipt of an email and a subsequent purchase, a metric associated with this set of events may be the ratio of purchase value to number of emails received. Connections between events are defined according to shared actors and with respect to how each event relates chronologically to the other Event, and is visualized graphically according to any of an absolute time value, a relative time value, or a conditional relationship. In an aspect, a user constructing a story query may be assisted by the system through accessing a search engine or hierarchy, through which the user can search for events, actors, or other data and metadata. In an aspect, upon the selection of multiple events, a user may be presented with potential connections between events. Graphically, such query construction is presented on a canvas in which events are graphically represented.

In certain embodiments, users of the system are able to visualize event-based data at an individual level and across aggregated data. In constructing and executing stories, or through automatic discovery through data analytics, a user with one or more specified business objectives can identify the events that serve as key drivers. The key drivers contribute to or detract from the identified objectives, which are additionally associated with metrics. The intensity of a key driver is determined according to the degree of positive or negative influence on the metrics per occurrence of the driver. Key driver impact is key driver intensity multiplied by the number of occurrences of the key driver.

In certain embodiments, knowledge of the key drivers in relation to a journey, which is a story for a single type of Actor, can aid the user in identifying a path along which an individual actor's actions can be anticipated and influenced in real time. In certain embodiments, triggers can be implemented along the monitored actor's path such that an action can be initiated when the actor's path matches an anticipated path to make it more likely the actor will react in a manner favorable to the identified objective. In this manner, transparency into actors, their actions, how their actions can be changed or maintained, and what actions will achieve one or more business objectives, can be used to improve the user's ability to shape experiences and optimize triggers having the greatest intensity and influence on different types of actors. Similarities between stories associated with types of actors can be drawn either manually or automatically, establishing story archetypes which can be used in modeling future actions for particular actor states, such as an actor demographic.

In certain embodiments, the system may additionally include data stream feeds, direct data streaming (as opposed to batch data transformation), a specialized event storage and analysis engine, machine-learning applied to event-based data and query constructions, collaboration features such as the ability to save and share predefined stories between users, and/or data transformation including event mapping, actor equivalence, taxonomy, and/or privacy.

In certain embodiments, the system may enable each customer to have its own instance of system components on a shared platform and infrastructure. Such a platform may support multiple concurrent customer users and allow for easy and cost effective deployment of new users without disturbing existing users.

In certain embodiments, the system may further be administered through one or more of the following interfaces: provisioning interface; configuration interface; monitoring interface; and/or web service interface. The provisioning interface can be invoked through a web application for example, which enables the platform administrator to create, suspend, and delete application instances. The provisioning interface accepts selections of optional modules for each application instance depending on the packing of the application. The monitoring interface can be invoked through a web application for example, which enables the platform administrator to create and manage the master administrator of the application instance. The monitoring interface provide supervision of the platform, which can allow for supervision of the platform security, compliance (privacy law), performance, statistics, resources, and/or applications. The web service interface can be one or more logging, monitoring, or billing interfaces. The logging interface can enable real-time logging of problems or security auditing. The monitoring interface can enable real-time monitoring of the application and its components. The billing interface can enable the collection of filling elements for each application instance.

One exemplary "End to End" method performed via the system can thus be described as follows: aggregating data from multiple sources using both batch and real-time streaming methods into a big data repository; transforming automatically data into the necessary structures to enable fast customer story definition/exploration; presenting a dashboard that includes multiple KPIs and associated metrics, wherein each metric is linked to customer story; exploring customer stories related to a KPI and identify key drivers; authoring and refining customer stories with a graphical interface or a query language; selecting a suit of events or drivers (path); and setting a trigger. In certain embodiments, the method further includes triggering of actions when a customer matches a certain path with a web services interface that can be integrated into an enterprise execution environment.

Further, the system can be especially adapted to be used by various business users with different rights and visibility. The rights and visibility can be regrouped in business roles such as marketing executives, marking analysts, marketing managers, administrators of the application, and integrators. In certain embodiments, marketing executives are granted access to a personalized dashboard from a web application or tablet. They can drill down in to KPIs and metrics to view underlying Stories. They can navigate into a story and do a first level analysis. They can select paths in the customer journey, save it and set triggers or share insights by email. In certain embodiments, marketing analysts are granted access to the analyst interface. They can search events and Actors and, create stories. They can author story query. They can explore existing stories, and create and view KPIs and metrics based on stories. In certain embodiments, the marketing managers are granted access to the personalized dashboard and analyst interface. They can explore and analyze existing stories, view and modify KPIs and metrics based on stories. They can select a path in a story and set triggers. In certain embodiments, the administrators of the application are granted access to the administration interface. They manage the data mapping, taxonomy and metadata. They monitor the data sources and manage Business Role, user rights and visibility. In certain embodiments, the integrators are granted access to a web service interface. The integrators are responsible for the data integration both batch and real-time. With an Extract, Transform and Load (ETL)

tool, they setup and schedule batch ETL jobs, map batch data to Event Data format, configure the ingestion of real-time data through the web service interface.

In various exemplary embodiments, the system may provide one or more graphical user interfaces, such as an executive dashboard, an analyst interface, a configuration interface, a monitoring interface, ETL integration tools, and/or a web service interface as further outlined herein. The executive dashboard can display the story behind each KPI metric. The executive dashboard can be implemented through a table and/or web client application for example. The executive dashboard can support various business roles that include respective rights and visibility. For instance, a CMO might have an unrestricted view with no limit on the data, but the VP of marketing for India who still has an executive role and may just see data related to India. The analyst interface can be invoked via a web application, for example, that enables real-time analysis of the unified customer journey across all relevant data sources for both individual customer and in aggregate. The analyst interface includes multiple workspaces: data view, canvas view, saved stories view, metrics view, and triggers view. Multiple business roles granting rights and visibility may be supported. The configuration interface can be implemented via a web application, which can enable KPI creation and configuration, metadata management, business, user right and visibility and security key management for web service. The monitoring interface can be used to supervise the data integration, performances, statics on the application, and resource consumption. The ETL integration tools can enable aggregation and transformation of data coming from structure data sources such as CRM, order management, POS. The web service interface can include one or more interfaces, such as a data streaming interface and a real-time triggering interface. The data streaming interface enables the real-time ingestion of events coming from web, mobile or other sensors. The real-time triggering interface enables integration with execution engines such as email automation, web optimizer, offer management or call center scripting.

Exemplary Component Architecture

Figure 6:
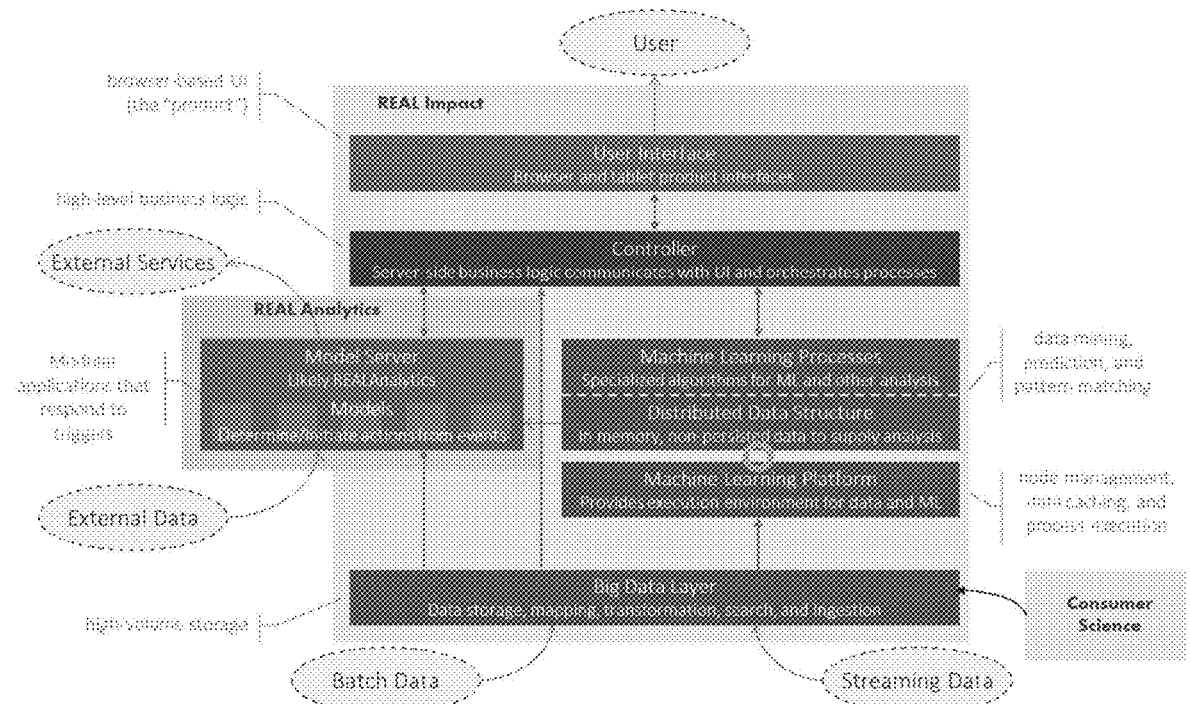
FIG. 6 is a block diagram illustrating an exemplary embodiment of a system component architecture in accordance with the present disclosure.
Figure 7:
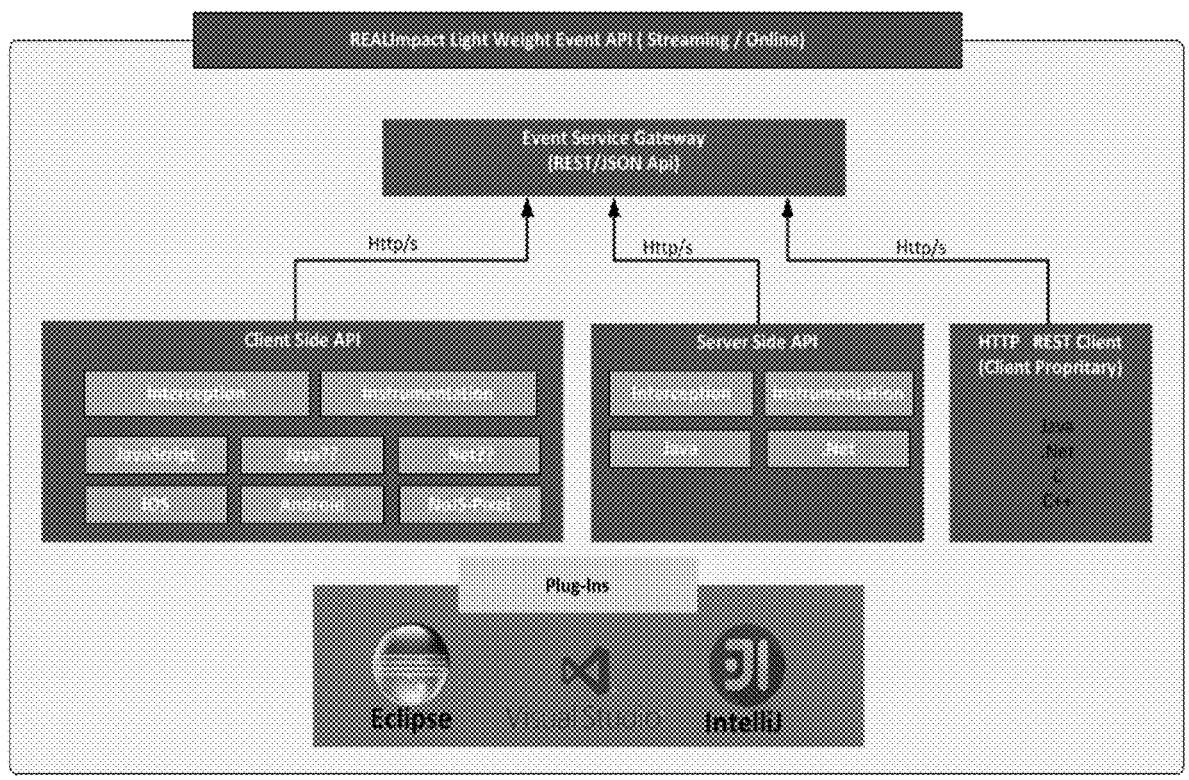
FIG. 7 is a block diagram illustrating an example event API of the example system architecture of FIG. 6.
Figure 8:
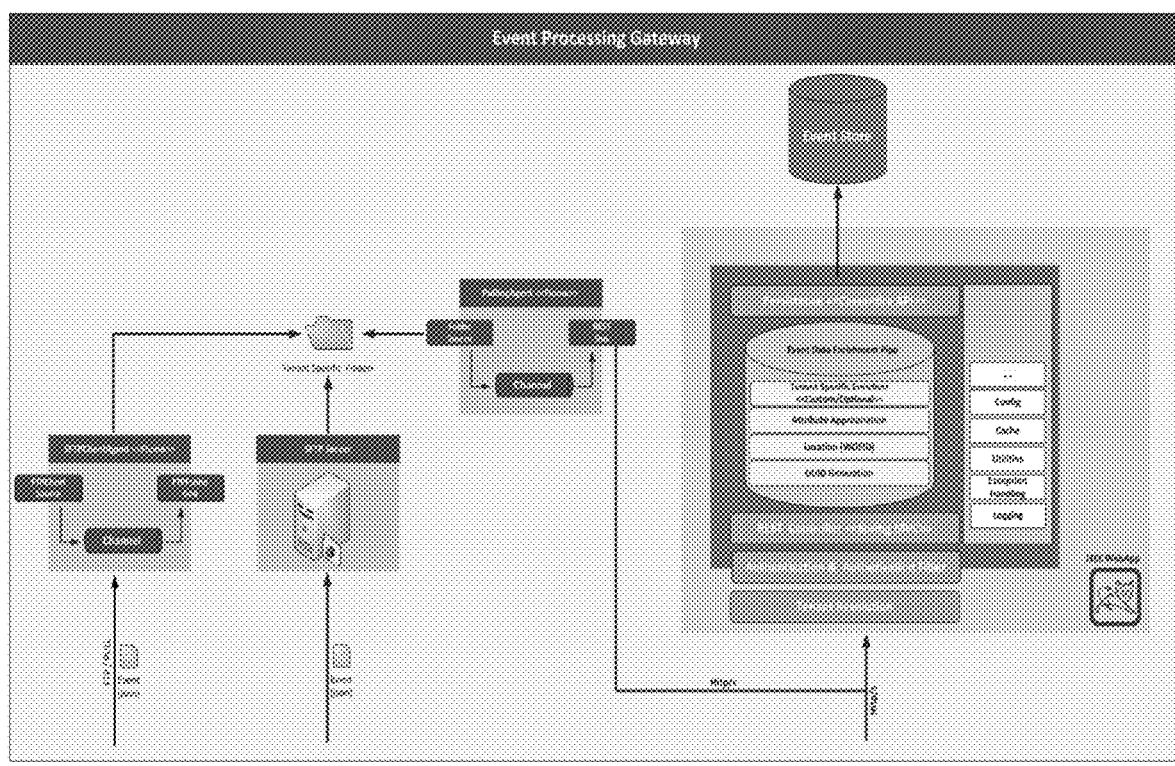
FIG. 8 is a block diagram illustrating an example event processing gateway of the example system architecture of FIG. 6.

As previously outlined, the system may comprise a number of internal components and sub-systems. FIG. 6 illustrates an example component architecture in accordance with the present disclosure. The components include a user interface (UI) 602, a controller 604, a model server 606, machine learning processes 608, a distributed data structure 610, a machine learning platform 612, and a data layer 614. The user interface 602 can include, for example, a browser-based UI. The controller can be configured to conduct server-side business logic communications with the UI 602 and to orchestrate one or more processes performed by the system. The model server 606 includes models that can be used to determine and/or initiate actions from events. The machine learning processes 608 can include specialized algorithms for machine learning and other analysis for example. The distributed data structure 610 can include in memory, non-persisted data to supply analysis. The machine learning platform 612 can provide an execution environment for distributed data structure 610 and the machine learning processes 608. The machine learning processes 608 and distributed data structure 610 can be used for data mining, prediction, and pattern matching processes. The machine learning platform 612 can be used for node management, data caching, and certain process execution. The model server 606 can include modular applications that respond to triggers. The data layer 614 can provide data store, and mapping, transformation, search, and ingestion processes. FIGS. 7-8 provide example architecture in which the components of FIG. 6 are implemented.

As demonstrated in FIG. 7, in certain embodiments, events enter the system from three categories of sources: client courses, server sources, and REST API. Client sources send single events directly as they occur in real-time from client-side web browsers or applications. Server sources can send single events as they occur in a similar manner to client sources. For instance, this might happen due to a trigger built into a database or logic programmed into a web application. Servers may also send large batches of data as files or streams of events. For instance, this might be a nightly update of a day's events. Clients can also build proprietary logic into their software which uses the open REST API to submit events. For instance, the developer of a desktop application may write logic to send an event every time a particular action in the software is performed. To facilitate the use of these event submission channels, plug-ins for popular IDEs could be released enabling developers to write event-creating code with less knowledge of the REST API details.

As demonstrated in FIG. 8, in certain embodiments, events data can actively or passively be drawn into the system. The active channel may poll a remote file location (e.g. an FTP directory) for new data. Upon finding a new or updated file in the remote location, the active channel downloads the data into a buffer by way of writing to the local file system. The passive channel is a server which accepts http requests containing event data and writes data into the same buffer by writing to the local file system. The buffer monitors the local file system for new or updated files, parses such files, and feeds them to the event processing system—which may also accept event data directly from other components. The event processing system handles transformation of the original event data text string into persisted event data—including indices, tenant validation, and data enrichment.

In certain embodiments, the components can be implemented in a distributed environment, such as a Grid based architecture and interface. For example, in certain distributed environments, the system includes a Grid Controller, one or more GridContexts, and a Query Controller. The Grid Controller can distribute data to individual Grid nodes in a cluster and may provide access to cluster management functionality and reporting. The Grid can run across a cluster of machines coordinated by an off-the-shelf platform. Each machine may run multiple Java Virtual Machines (JVMs). The one or more GridContexts, which can execute queries, can be included in the JVMs. The queries can be split across the JVMs in the cluster and can contiguously aggregate results from multiple GridContexts on a JVM. The Query Controller can be used to split up queries across multiple machines and JVMs and to periodically aggregate updated results across the distributed queries. The query can contain the specifications for the analysis to be conducted and the results to be returned. A client UI can submit a query and periodically request and display updated results throughout query execution.

In certain distributed environments, the components may be asynchronous/non-blocking. The queries can continuously send back intermediate results to the UI. The UI can then estimate the final result and calculate a confidence interval around the final result. The confidence interval can tighten and eventually disappear when the query is complete. If a node/JVM is down, results may still be returned without ill effect as queries may, by way of their estimation capability, function on partial data. Queries can be sent from the UI and distributed among the nodes by the Query Controller using a story query "language" in JSON form. Data may be pushed into a GridContext at the same time as queries are being executed. Moreover, multiple data sources can be pushed into the same GridContext at once.

The components of the system, whether implemented in a distributed environment or locally, may interact to provide functionality as described herein. Specifically, data may be assessed, analyzed, evaluated, modeled, and/or presented by the system according to various methods. Exemplary methods are provided below according to an exemplary embodiment of the present disclosure.

Exemplary Events

Users can manipulate events resulting from the aggregation of individual event data points through a graphical user interface. Events are defined by their event type and a timeframe. Events may be filtered according to actors, actor types, actor states, location, labels or values. Aggregation can vary depending on whether the event is part of the story. For example, isolate events (not connected to any other event) resulting from the aggregation of all individual event data points of the same event type. Upon an event being connected with another event, the connection between the events defines the actor type, which and allows calculation of the timeframe over which the aggregation is done. The timeframe can be calculated by, for example, subtraction or addition of the distances between the event and the event of interest. Distances might be an absolute value, such as within x minutes, hours, days, months, years, or a relative value, such as the closest, the furthest or all. Automatically a double aggregation of all individual event data points of the same event type is done. First the aggregation is performed at individual actor level and then a second pass aggregates all the individual actor aggregation.

An example event can include one or more of the following information: event type, timeframe, count of event data points, time series, location series, count of actors, count of actors type, list of actors, label names, labels, value names, and values. The timeframe can be the start date and end date of the aggregation at the time of the visualization. The timeframe can be set manually in certain situations, for example, if the event is set as an event of interest. The timeframe can bet set to "From the beginning to Now" as a default value in certain situations. In certain embodiments, the time series includes a list of event data point time stamps. In certain embodiments, the count of actors can comprise the number of individual actors that generated the event data points. Each event data point must have at least one actor. An isolated event may include different actor types. The count of actors type is one, or if the event is an isolated event, the count of actors type is the number of individual actors type that generated the event data points. The list of actors includes the actors who generated the event data points. An isolate event might include different actor types. The label names are a combination of the label names transported by each event data point. Labels are the combination of the Labels transported by each event data point. The value names are a combination of the value names transported by each data point.

Figure 9:
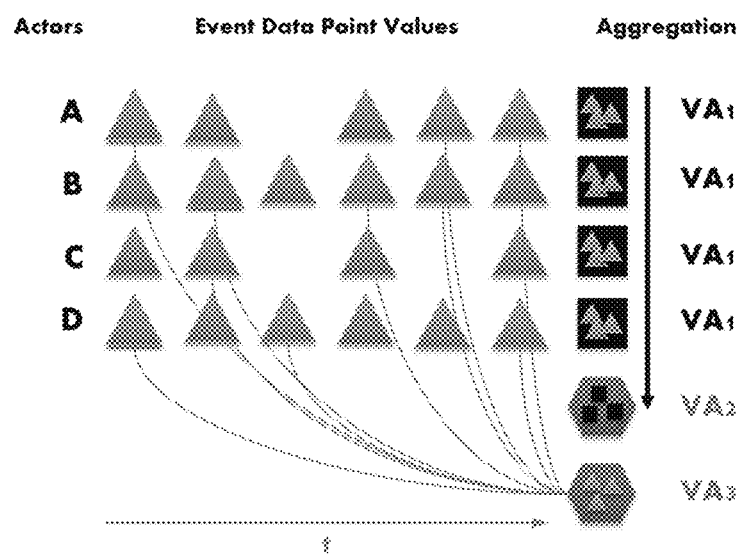
FIG. 9 is a block diagram illustrating an exemplary embodiment of multiple sequential aggregation in accordance with the present disclosure.

When performing an aggregation, one indicates the events to be aggregated by specifying a filter on event properties and on their associated actors. In certain embodiments, an aggregation will derive a single numeric output by applying a transformation to the full set of values of a desired value name across all event data points and their associated actors, assuming both the events and their actors pass the given filtering criteria. The same actor may be associated with more than one valid event data point, so aggregations may be split into two separate functions—first an aggregation of values (of the same value name) across all of an actor's event data points, the actor-wise outputs of which can be aggregated by a second function. In certain embodiments, multiple sequential aggregations can be reduced to a single aggregation function applied to all matching events at once, see for example FIG. 9. The follow are some sample cases in which multiple sequential aggregations are reduced to a single value: Sum(sum(v[actor])) ⇒Sum(v[all]); Sum(count (v[actor]))⇒Count(v[all]); Sum(v[all])/Count(v[all])⇒Average(v[all]); and SumSq(v[all]–Average(v[all]))/Count(v[all])⇒Variance(v[all]).

In certain embodiments, the system can support one or more of the following manipulations on events: time selection; filter by actors, actor types, actor states, labels, and values; group by actors, actor types, actor states, labels, and values; and select chart and visualization type. The time selection can define the period over which the aggregation is performed. The timeframe can be expressed in various suitable ways. For example, the timeframe can be expressed as a start and end date or as a literal phrase such as "Today, yesterday, this/last week, month, quarter, year, the last x days, weeks, months, years . . . " In regards to chart and visualization type selection, by default in certain embodiments any event can present the distribution of events over the prior of time and present the distribution of number of event by location.

Exemplary Connection(s)

The connection defines the distance in time and the actors type between two events. Distances might be an absolute value; within x minutes, hours, days, months, years, or a relative value such as the closest, the farthest, or all.

In certain embodiments, when two events are connected, the user selects the actor type that the user wants to use for the connection if multiple actor types are shared between the events. If one of the events is already connected with another event using an actor type that is shared by the two events, then the shared actor type is selected by default. After the actor type is selected, the user then sets the distance between the events. If the distance specified is set to closest or farthest, then only the events that are the closest or the farthest for the particular actor type are considered in the aggregation. If the distance specified is set to all, then all the events are considered in the aggregation irrespective of distance.

Figure 10A:
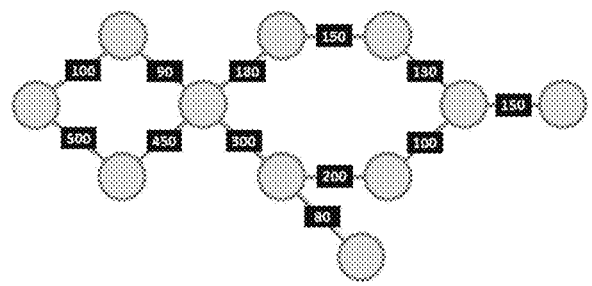
FIG. 10A is a view of a graphical user interface illustrating an example visual representation of exemplary connections in accordance with the present disclosure, in which the connections visually depict a number of actors between respective events.
Figure 10B:
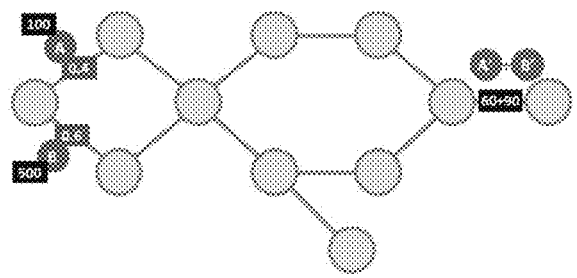
FIG. 10B is a view of a graphical user interface illustrating an example visual representation of exemplary connections in accordance with the present disclosure, in which the connections visually depict contribution rates between events.
Figure 10C:
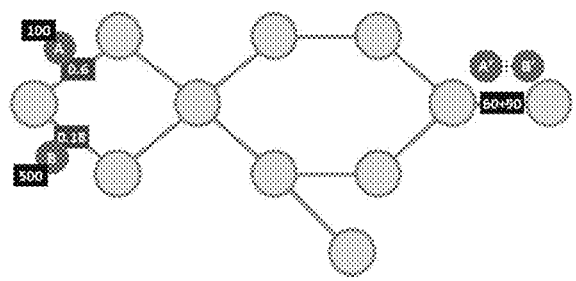
FIG. 10C is a view of a graphical user interface illustrating an example visual representation of exemplary connections in accordance with the present disclosure, in which the connections visually depict conversion rates between events.
Figure 10D:
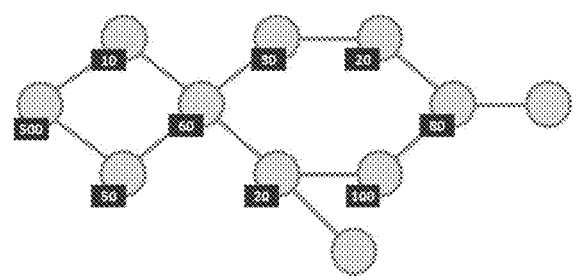
FIG. 10D is a view of a graphical user interface illustrating an example visual representation of exemplary connections in accordance with the present disclosure, in which the connections visually depict dropout rates between events.

When a user selects a connection via the graphical user interface, the user can be presented with various kinds of information that is superimposed onto the presentation. For example, as shown in in FIG. 10A, the user may be presented with the number of actors between the events. As shown in FIG. 10B, the user may be presented with a contribution rate, which is the ratio of actors that contribute to the results. In particular, the number of actors present at both the connection and even of interest is compared to the total number of actors present at the event of interest. As shown in FIG. 10C, the user may be presented with a conversion rate, which is a ratio of the number of actors that reached the event of interest as compared to the number of actors present in the connection. As shown in FIG. 10D, the user may be presented with a dropout rate, which is the difference between the number of actors who entered the event and the number of same actors who entered any of consecutive events.

In certain embodiments, by selecting a connection, the user can select a different actor type, filter the actor type based on specific actor states, and/or create a target list that includes each actor participating to the connection. In certain embodiments, when the user filters a connection by selecting a specific actor state, label or value, then all the connections that are characterized by a same actor type are filtered in the same way.

Exemplary Distance Dependencies

Figure 11:
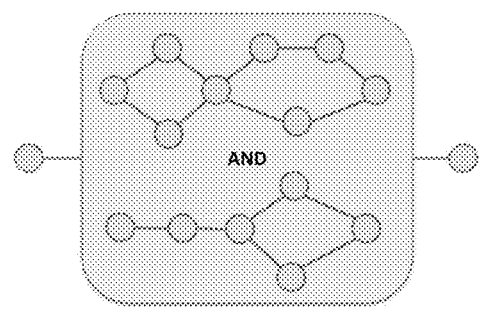
FIG. 11 is a view of a graphical user interface illustrating an example visual representation of exemplary connections in accordance with the present disclosure.

Connections might be defined based on the presence or absence of multiple events together. The distance can be expressed as a combination of operators and events, for example: Event-A AND/OR Event-B AND/OR Event-C . . . within X days before/after the Event-X. The visual representation of the connection displayed to the user, enables the user to differentiate paths and dependencies. See for example FIG. 11

Exemplary Actors

As previously described, an actor may be a person, place or thing that participates in one or more events. The actor type defines the category and expected states for an actor. For instance, the actor type "Customer" will define the states that characterize the customer.

Figure 12:
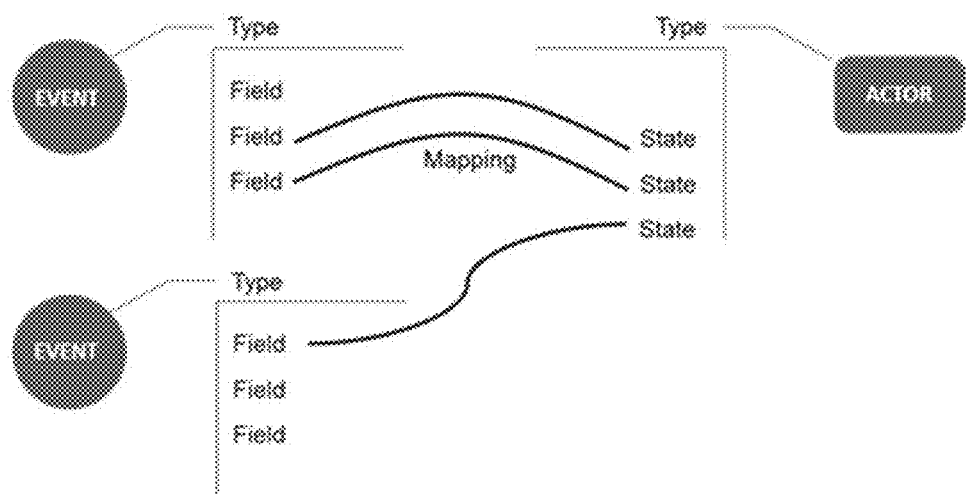
FIG. 12 is a diagram illustrates an example mapping of actor states to event data fields in accordance with the present disclosure.

As shown in FIG. 12, an actor state is a mapping and transformation of an event data field to an actor as a function of time. The mapping can include, for example, a direct value or label, the result of a metric, or the result of a model, for example. The configuration interface enables a user to map event data field, metrics or model result with actor states. For example, the actor state "Loyal customer" might be the result of the mapping of the event data field "Card Number" in the event "Loyalty Card subscription."

Because each event is relative in time, the state of an actor might change depending on when the actor state is observed. For instance, if a consumer subscribed to a loyalty membership last month, the state "Loyal customer" will be false if you look at its Value 2 months ago and then true today.

Some events might be specialized to define actor states. For example, the user might use the event "Set Segment" to profile a customer. These events can be generated by an external application, by the user, or by a trigger, for example.

Exemplary Actor State Discovery and Predictions

In certain embodiments, the user is provided with an actor management interface that enables discovery of actor states and the creation of target lists. The interface enables the user to browse actor states, select actor states, and to define relationship between them such as AND, OR, NOR, NAND. Through use of the interface, the user can visualize the evolution of the actor state over the time and define selection rules such as "All the actors with the Actor State A that changed from X to Y within two days". In certain embodiments, the interface can display in real time the number of the actors concerned by this selection and enable the creation of a target list by the user.

In a marketing environment, the interface can be used to enable a marketing user to understand how a given customer profile evolves over time. Moreover, as a result of applying the learning engine and optimization models described herein, the interface enables the marketer user to identify key drivers that influence particular actor states and/or predict what will be the value of a particular actor state in comparison to other group(s) of actors. Doing so, the marketer can develop smarter segmentation strategies and anticipate future customer behaviors.

Exemplary Story Metaphor

As noted above, a story may comprise a pattern representing a set of events connected by common actors and their relationships in time. The relationship in time preserves the integrity of the customer experience across channel and process. For instance, a story might be a succession of consumer interactions such as "landing on the home page>→Log in→navigate to product page→Add product to cart . . . ." A story is the trace that each individual consumer creates when interacting with the company. By analyzing each individual consumer's story, the system's learning engine can create a general archetype that represent a common story for a group of consumers.

Figure 13:
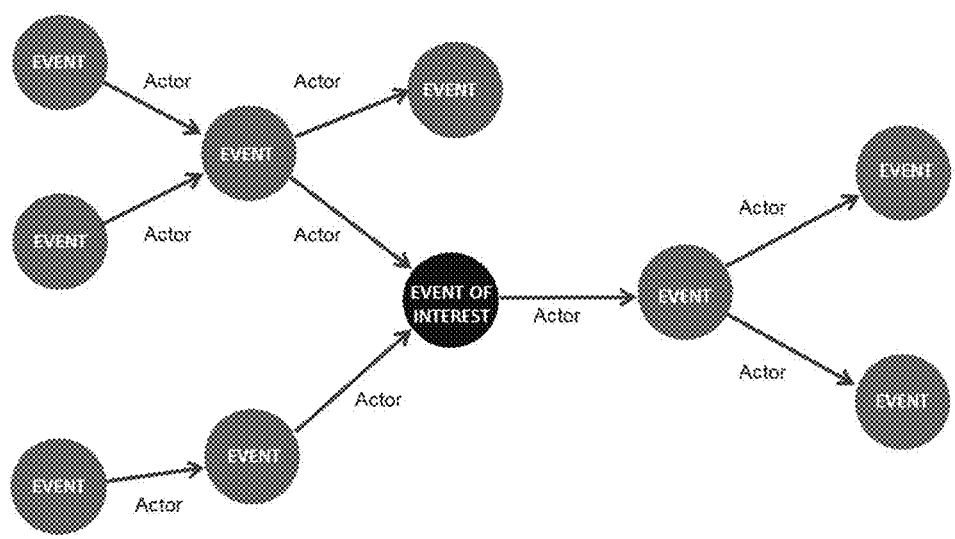
FIG. 13 is a view of a graphical user interface illustrating an example visual representation of events in accordance with the present disclosure.

Referring to FIG. 13, an example events representation is illustrated. The events representation is an aggregation of multiple independent and individual events traced by each actor. The arrows of FIG. 13 represent the actors that link two events and their relationship in time. The event of interest is the anchor from which and to the story is built.

Figure 14A:
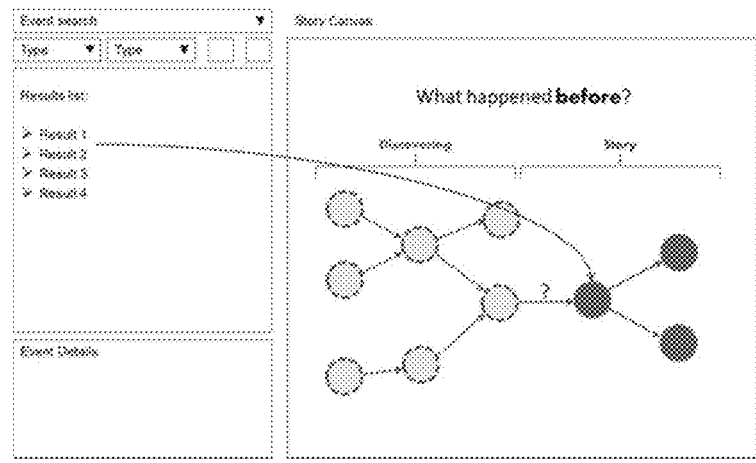
FIG. 14A is a view of a graphical user interface illustrating an example of a graphical canvas for graphical story discovery based on actor relationships.
Figure 14B:
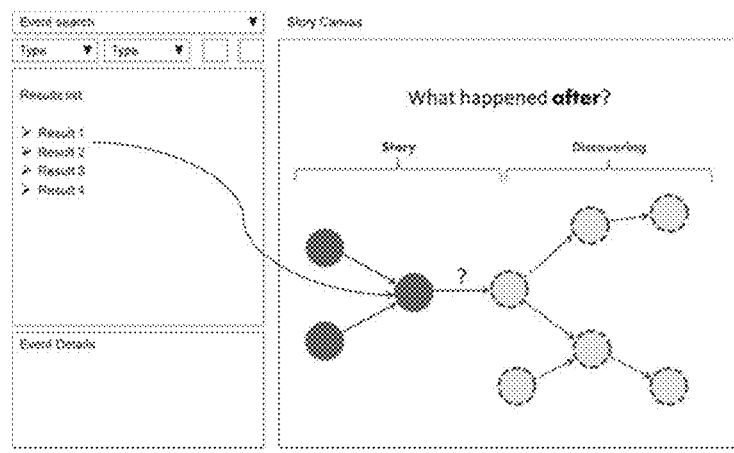
FIG. 14B is a view of a graphical user interface illustrating another example of a graphical canvas for graphical story discovery based on actor relationships.
Figure 14C:
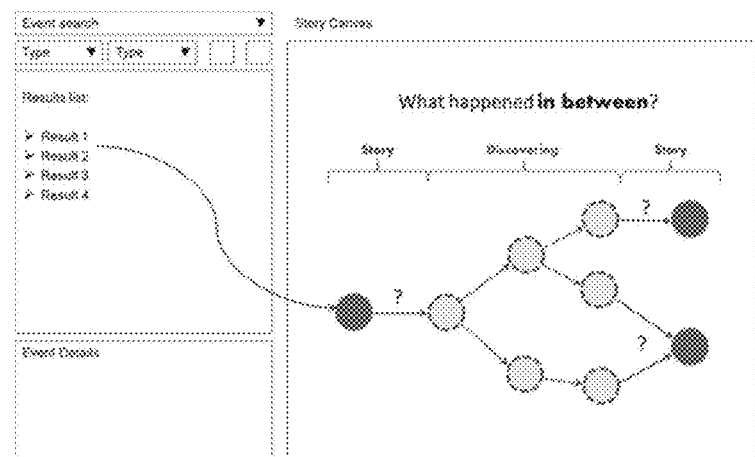
FIG. 14C is a view of a graphical user interface illustrating another example of a graphical canvas for graphical story discovery based on actor relationships.

In certain embodiments a user can create stories with the analyst interface via a query language, like the ones disclosed above, and/or via a graphical manipulation of elements as described below. In regards to the graphical creation of stories, a user may interact with the analyst interface by assembling events and connecting them by their common actors. A search engine can be used to enable a user to find and event and then drag and drop then event in the canvas. The application will help the user create the story by automatically discovering the actors and events before, after or in between two events. FIGS. 14A-C illustrates examples of graphical story discovery based on actor relationship.

As indicated above, a story can be generated using a query language like the ones disclosed above. A story can be visualized graphically or as a query and a user can switch between one view and another.

Figure 15:
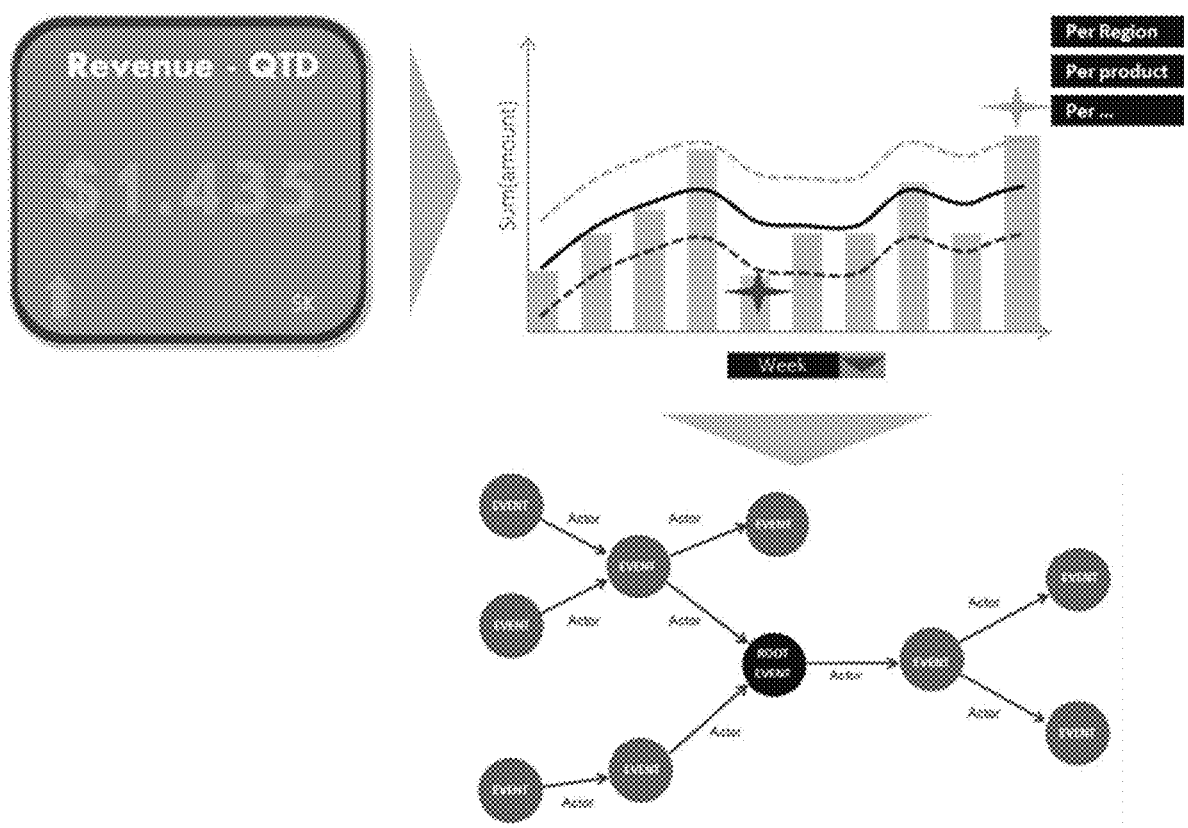
FIG. 15 is a diagram illustrating an example metric view (chart) and an example story view (graph) which a user may switch between through the graphical user interface.

In marketing environments, for example, a marketing executive user can visualize and navigate into stories behind metrics using the system described herein. From a dashboard, the user can drill down in a KPI to see the metrics(s) composing the KPI. Each metric is in turn comprised of data drawn from event data fields and actor states within a story. As shown in FIG. 15, a user can switch from a metric view (chart) to the story view (graph).

Exemplary Zooming

Figure 16:
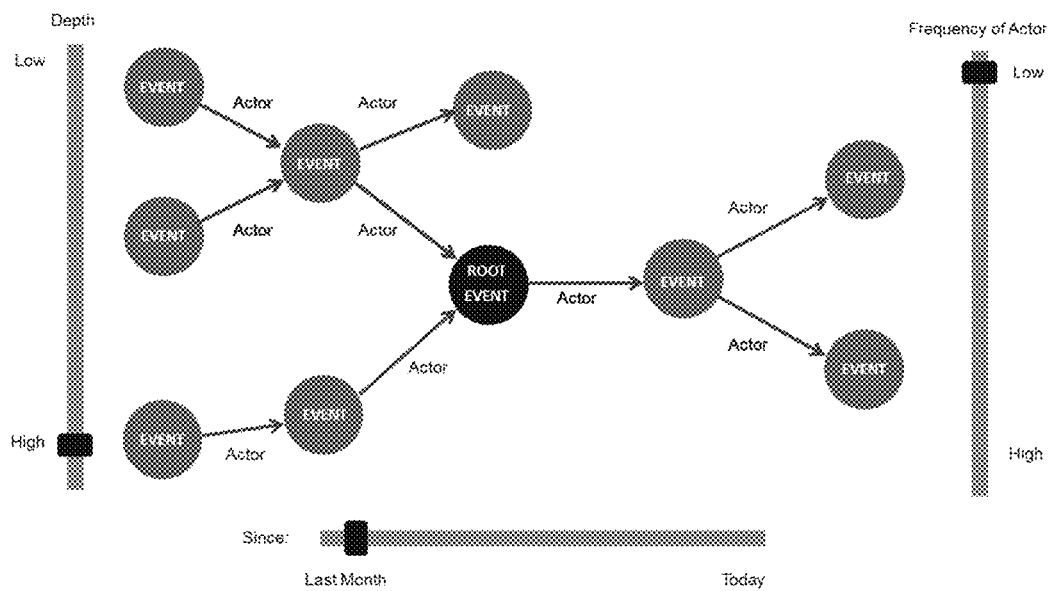
FIG. 16 is a view of a graphical user interface illustrating an exemplary depiction of a story, in which the visual representation includes a selectable depth a scroll filter, a selectable time scroll filter, and a selectable frequency of actor scroll for filtering.
Figure 17:
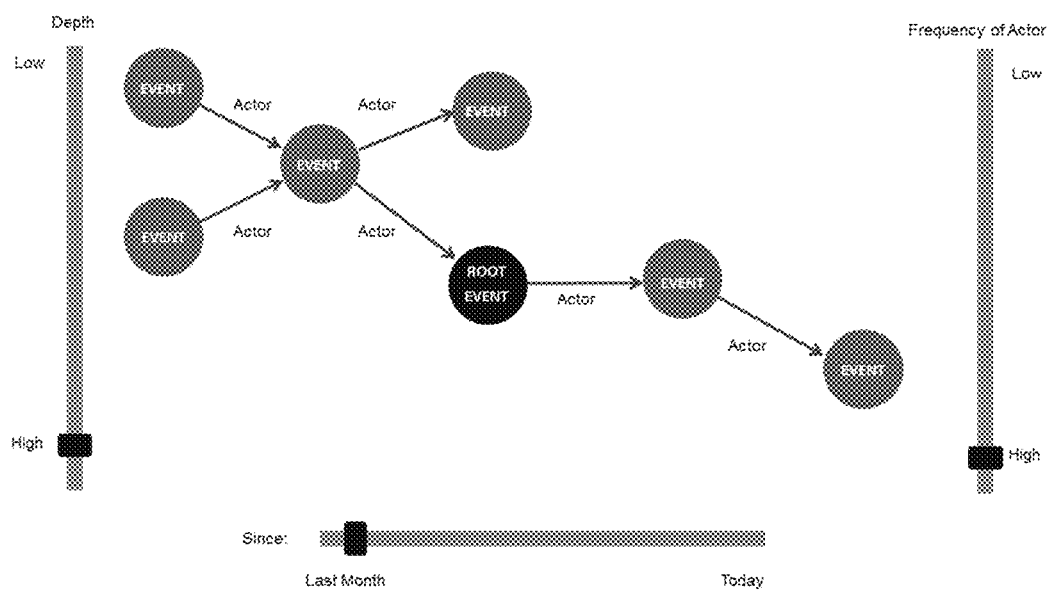
FIG. 17 is a view of a graphical user interface illustrating an exemplary depiction of the visual representation of FIG. 16 in which a story is being filtered based on frequency of actors in accordance with the present disclosure.
Figure 18:
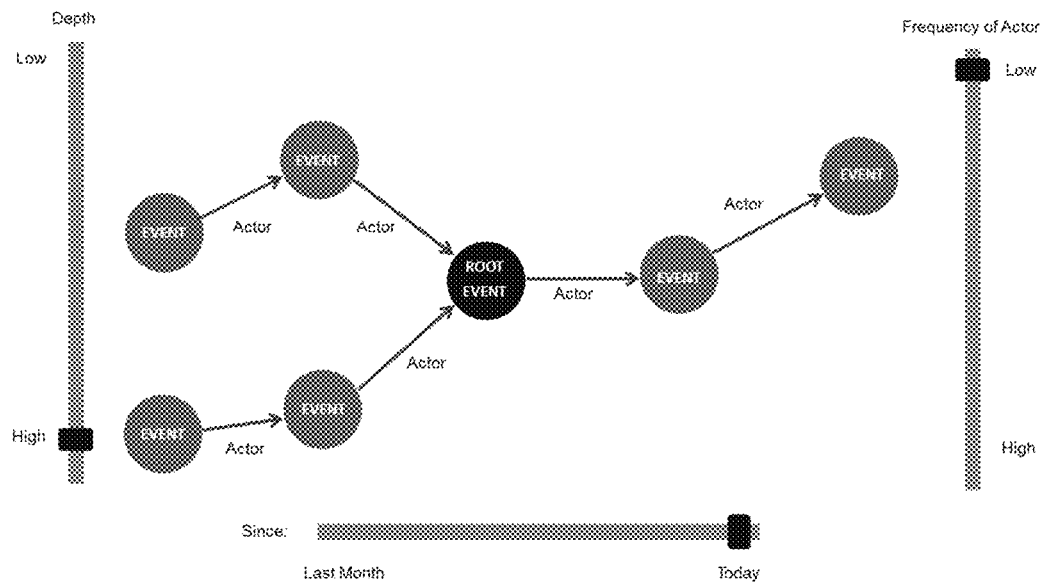
FIG. 18 is a view of a graphical user interface illustrating an exemplary depiction of the visual representation of FIG. 16 in which a story is being filtered based on time in accordance with the present disclosure.
Figure 19:
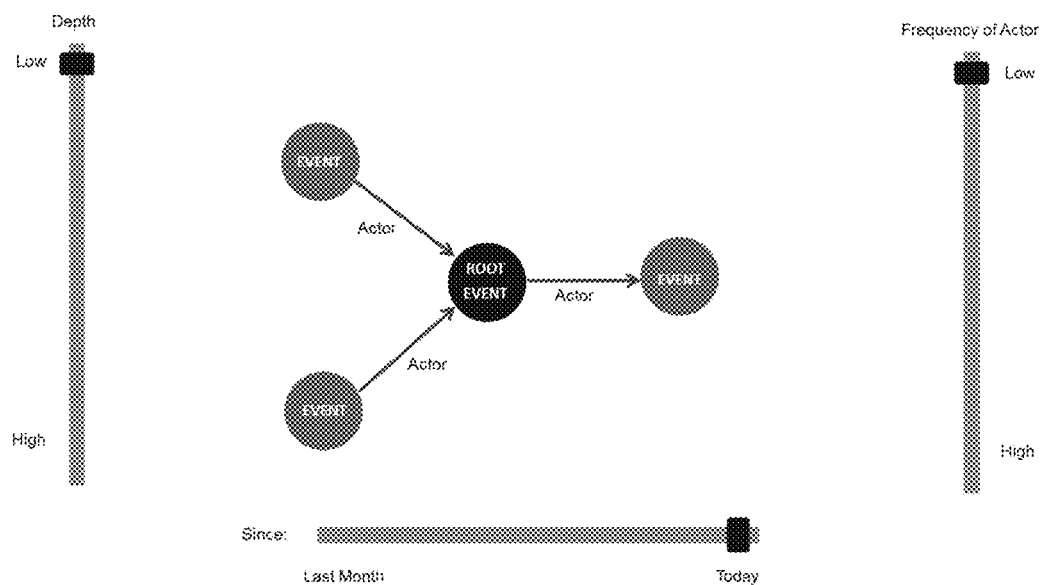
FIG. 19 is a view of a graphical user interface illustrating an exemplary depiction of the visual representation of FIG. 16 in which a story is being filtered based on depth in accordance with the present disclosure.

Zooming in on a story can reveal or mask events and paths as a function of: the frequency of actors, the time, and/or the depth of detail. FIGS. 16-19 illustrate exemplary depictions of stories in accordance with the present disclosure, in which the visual representation includes selectable depth scroll filter, a selectable time scroll filter, and a selectable frequency of actor scroll. In particular, FIG. 16 illustrates an exemplary depiction of a story that does not have active filters. FIG. 17 illustrates an exemplary depiction of a story that is being filtered based on frequency of actors. FIG. 18 illustrates an exemplary depiction of a story being filtered based on time. FIG. 19 illustrates an exemplary depiction of a story filtered based on depth in accordance with the present disclosure.

Exemplary Distance Between Events

Figure 20:
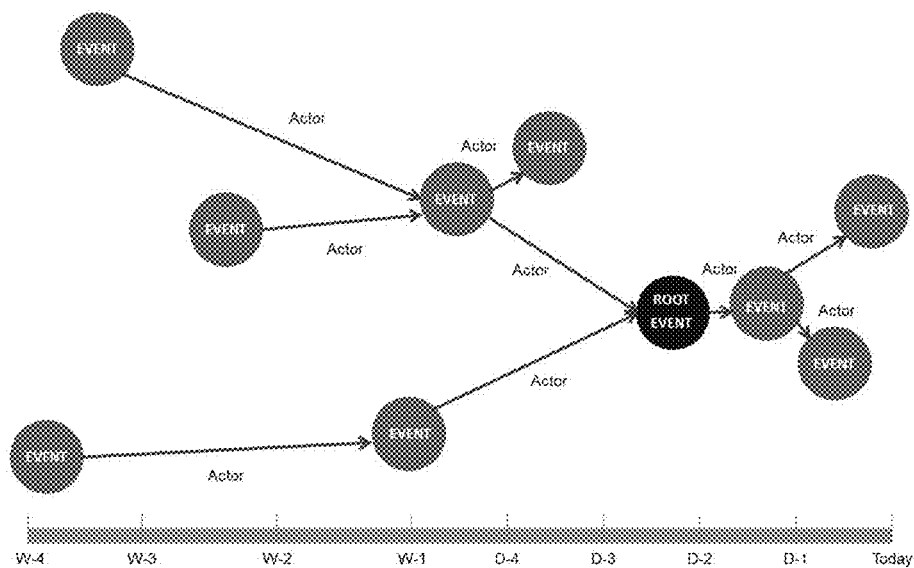
FIG. 20 is a view of a graphical user interface illustrating an exemplary depiction of a story that displays distances between events in accordance with the present disclosure.

FIG. 20 illustrates an exemplary depiction of a story that displays distances between events in accordance with the present disclosure. Revealing the distance in perspective between events relative to a particular time/date enables user to understand when events happened in a given time scale.

Frequency of the Actors Example

Figure 21:
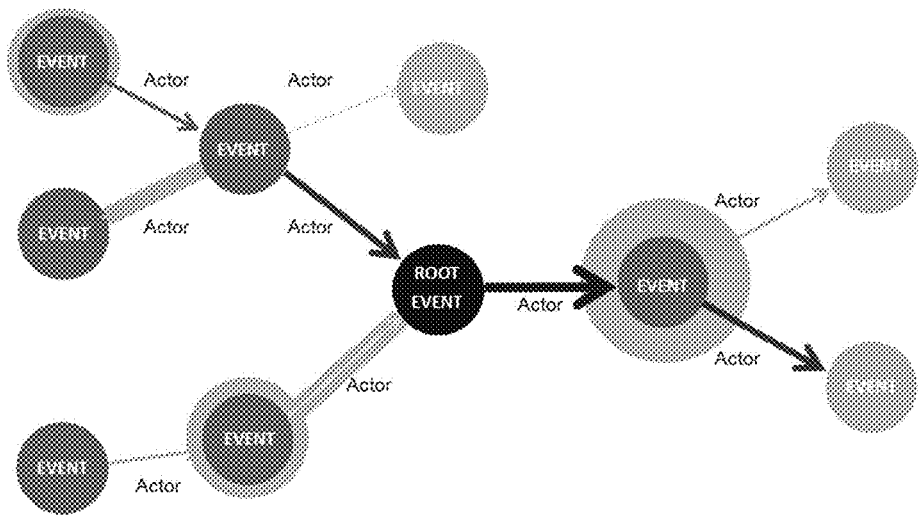
FIG. 21 is a view of a graphical user interface illustrating an exemplary depiction of a story that reveals the volume of actors in each connection in accordance with the present disclosure, in which a user can switch between a flow view, a contribution view, a lost view, and a conversion view.

FIG. 21 illustrates an exemplary depiction of a story that reveals the volume of actors in each connection, in which a user can switch between a flow view, a contribution view, a lost view, and a conversion view. The flow view shows the number of actors on each connection. The contribution view shows the number of actors on each connection that successful went to the event of interest versus the total number of actors that went successfully to the event of interest. The lost view shows the number of actors lost at and in between each event. The conversion view shows the number of actors on each connection that successfully went to the event of interest versus the number of actors on each connection.

The frequency can be viewed from the perspective of the story path, for example, the number of actors that follow the story archetype. The frequency can be view from the perspective of the event of interest as well, for example, the number of actors that reach the event of interest by any path including paths that are a deviation from the main archetype.

Exemplary Filtering

Figure 22:
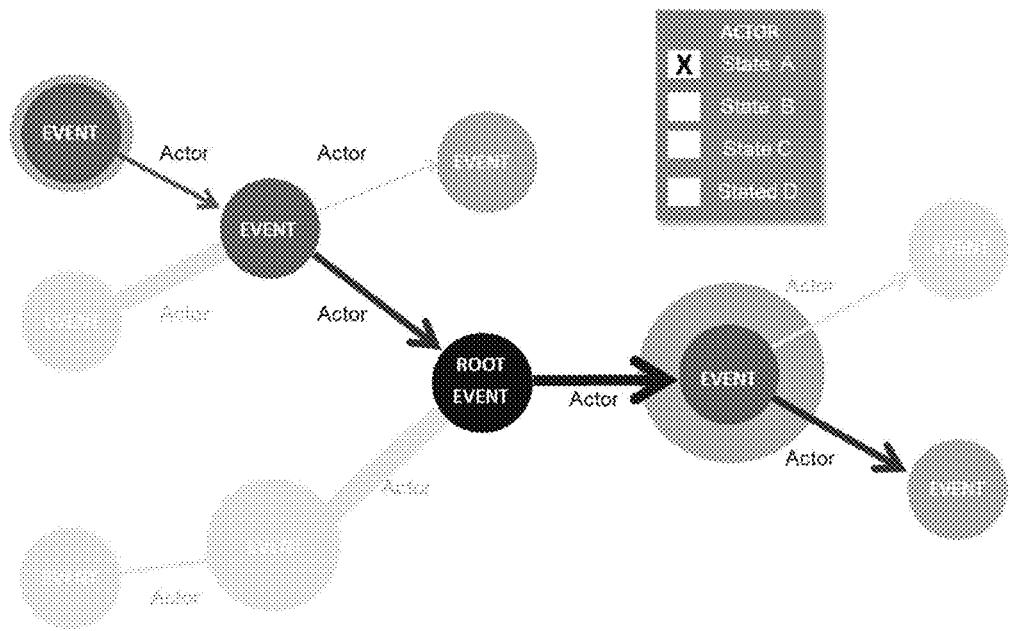
FIG. 22 is a view of a graphical user interface illustrating an example of filtering based on actors or actor states in accordance with the present disclosure.

FIG. 22 illustrates an example of filtering based on actors or actor states. In particular, upon a user selecting one or more actors or actor states, the system filters the story to show only the events where the selected actors or actor states are present.

Figure 23:
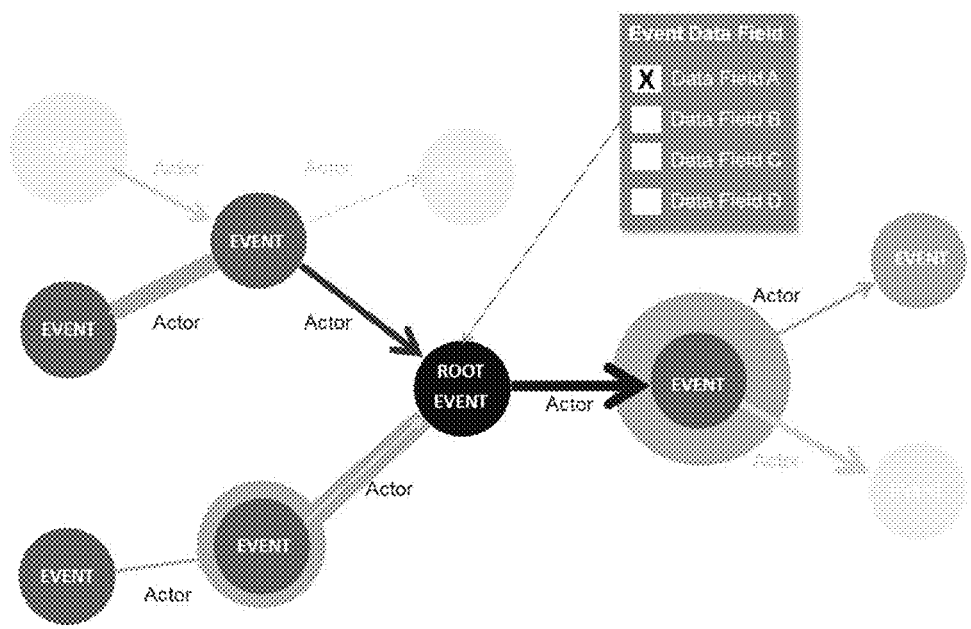
FIG. 23 is a view of a graphical user interface illustrating an example of filtering based on event data fields in accordance with the present disclosure.

FIG. 23 illustrates an example of filtering based on event data fields. In particular, upon a user selecting one or more event data fields for a particular event, the system filters the story to show only the events where the selected event data fields are present.

Exemplary Path Selection

Figure 24:
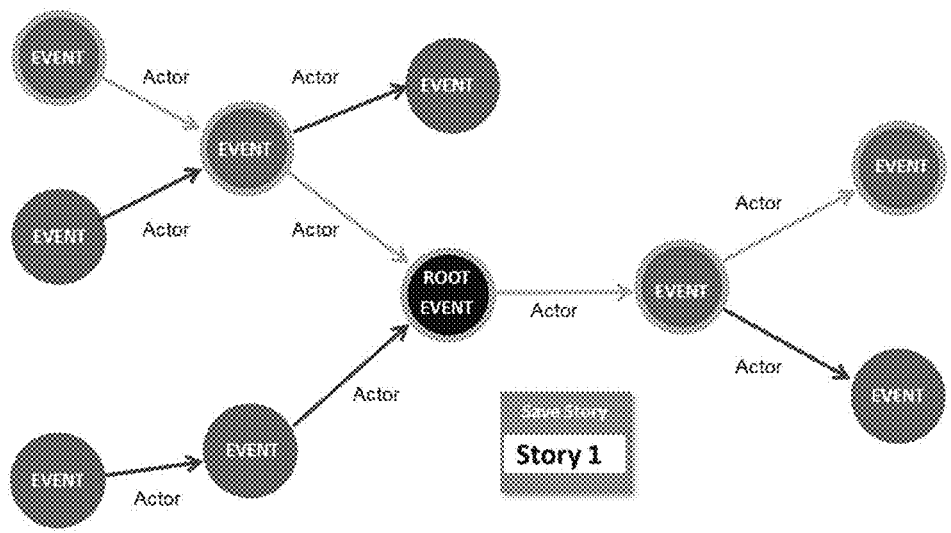
FIG. 24 is a view of a graphical user interface illustrating an example visual representation for storing a story in accordance with the present disclosure.
Figure 25:
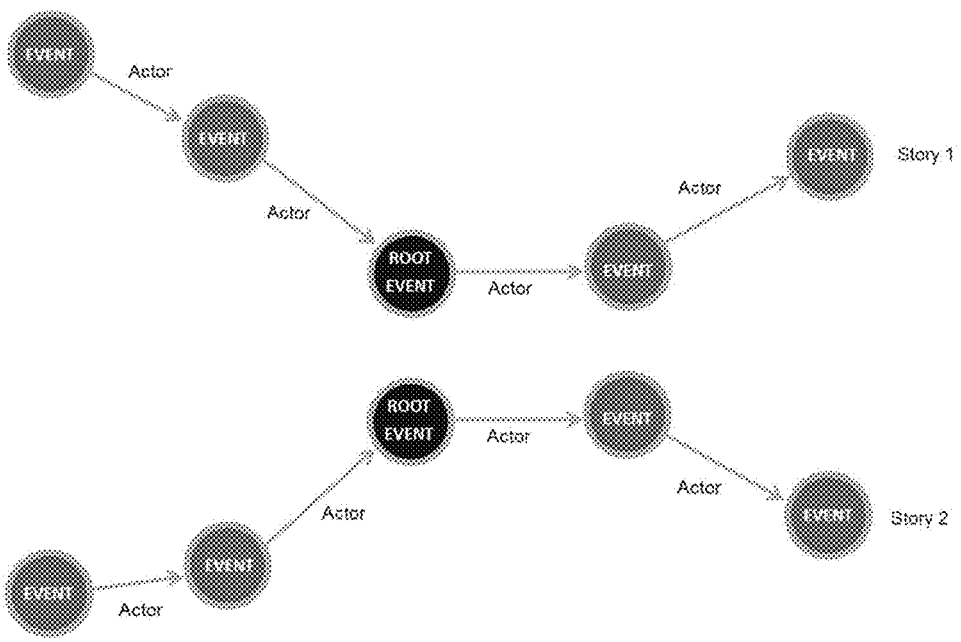
FIG. 25 is a view of a graphical user interface illustrating an example visual representation for comparing multiple stories in accordance with the present disclosure.
Figure 26:
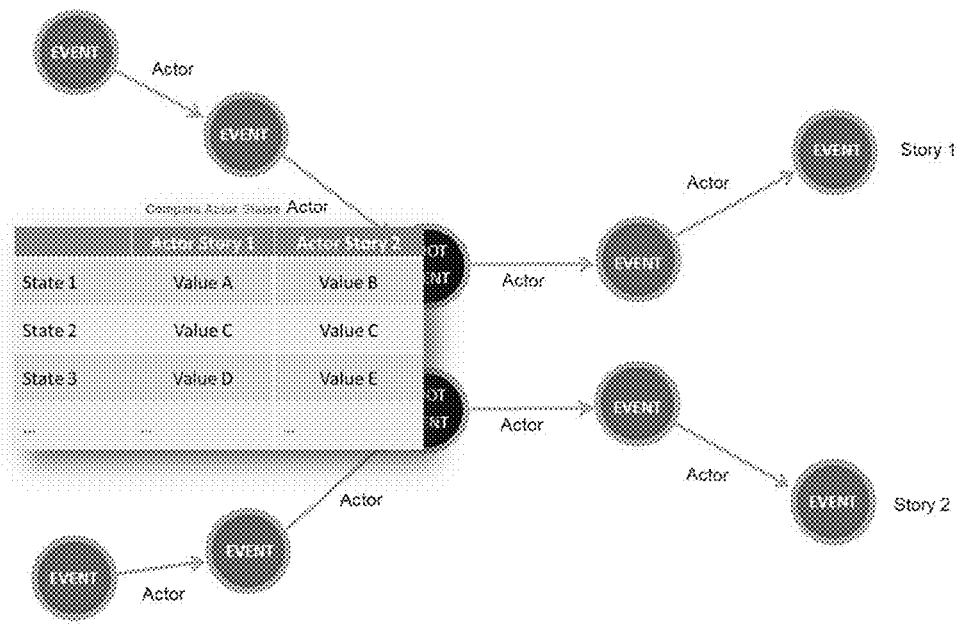
FIG. 26 is a view of a graphical user interface illustrating an example of visual representation for comparing actor states of multiple stories in accordance with the present disclosure.
Figure 27:
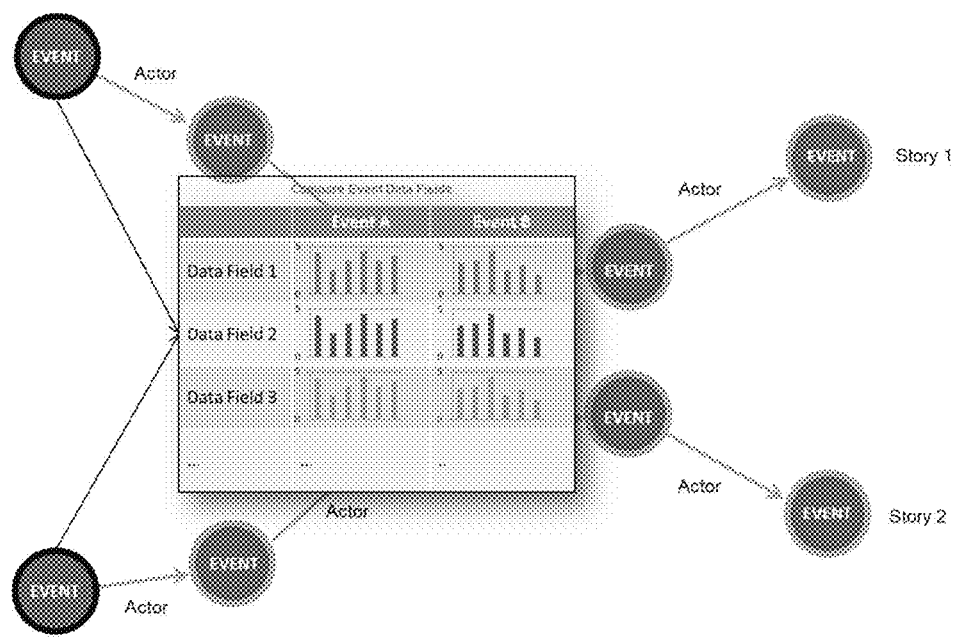
FIG. 27 is a view of a graphical user interface illustrating an example of visual representation for comparing event data fields of multiple stories in accordance with the present disclosure.
Figure 28:
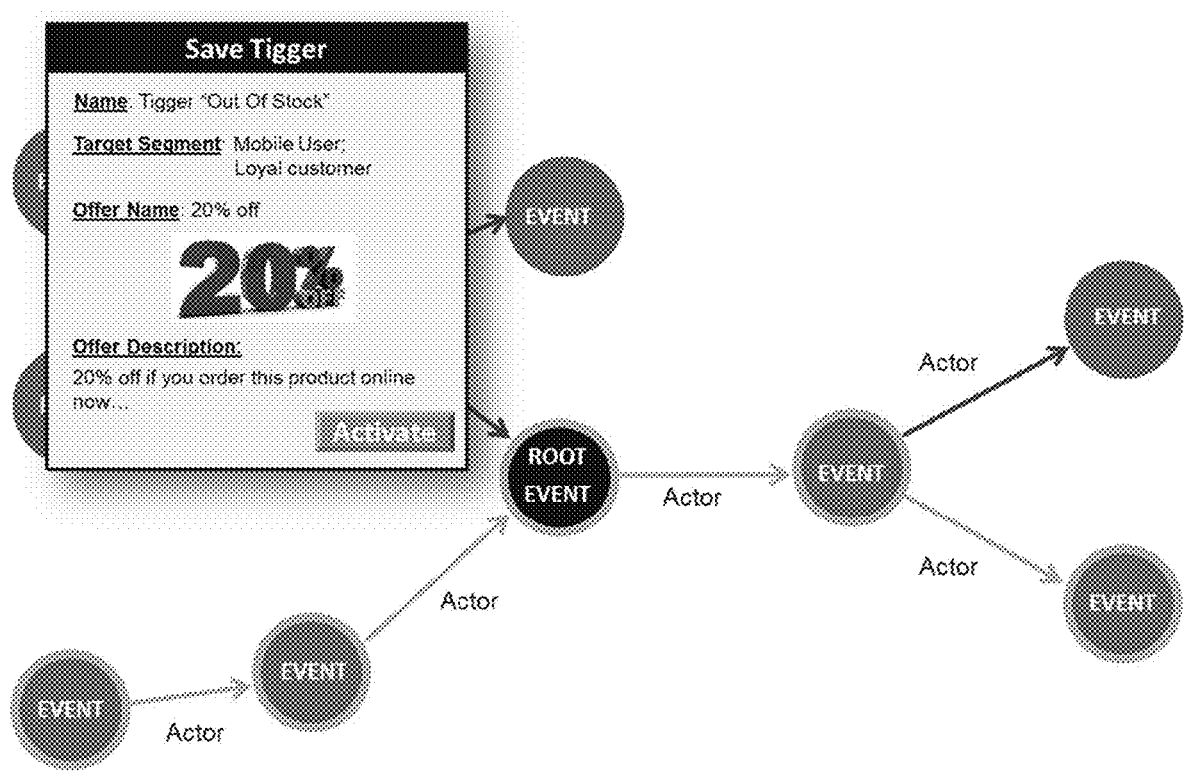
FIG. 28 is a view of a graphical user interface illustrating an example of visual representation for saving a trigger for a path in accordance with the present disclosure.

In certain embodiments, the user selects a succession of consecutive events through the graphical user interface and indicates to the system that the user wishes to save the selected events as a story. If filters are active then, then the active filters are saved with the story. See for example FIG. 24. The user can reload one or multiple stories and compare them on the screen. See for example FIG. 25. When multiple stories are compared, the user can compare actor states side by side on different stories. See for example FIG. 26. When multiple stories are compared, the user can select one identical event in each story and compare the event data field side by side. See for example FIG. 27. When the user has selected a path, he can set and save a trigger for this path (See Exemplary Real-Time Triggers below). See for example FIG. 28.

Exemplary Event Analysis

Figure 29:
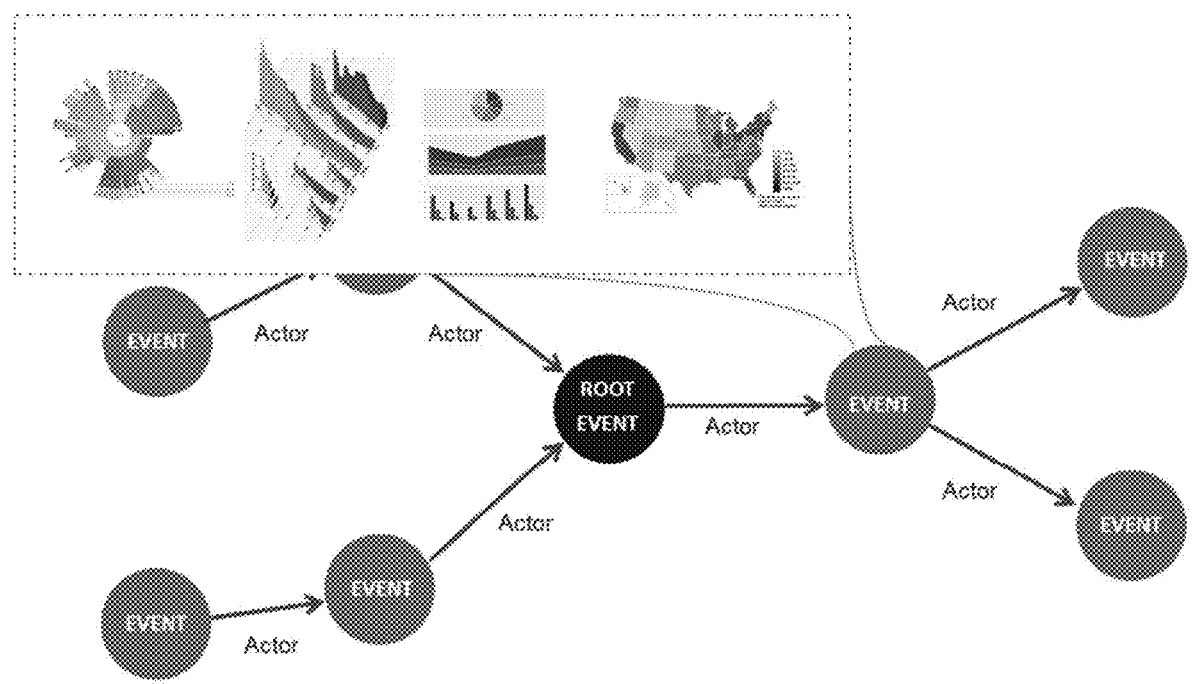
FIG. 29 is a view of a graphical user interface illustrating an example of visual representation for selecting an event and accessing graphs and reports associated with the event in accordance with the present disclosure.

In certain embodiments, the user can select an event and then access graphs and reports associated with the event through the graphical user interface. Referring to FIG. 29, the event "Check Out" might be associated with sales analysis/graphs/reports.

Exemplary Actor Analysis

Figure 30:
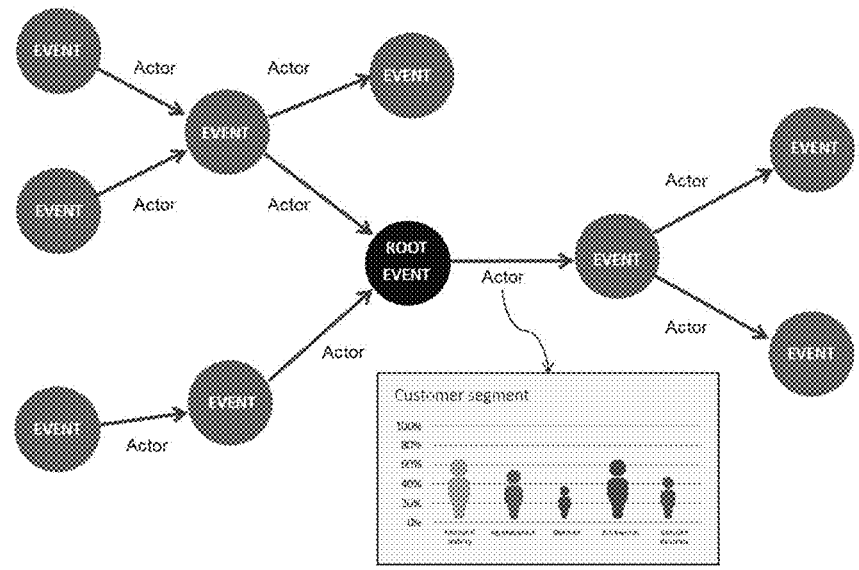
FIG. 30 is a view of a graphical user interface illustrating an example of visual representation for selecting a link between events and accessing graphs and reports associated with the link in accordance with the present disclosure.
Figure 31:
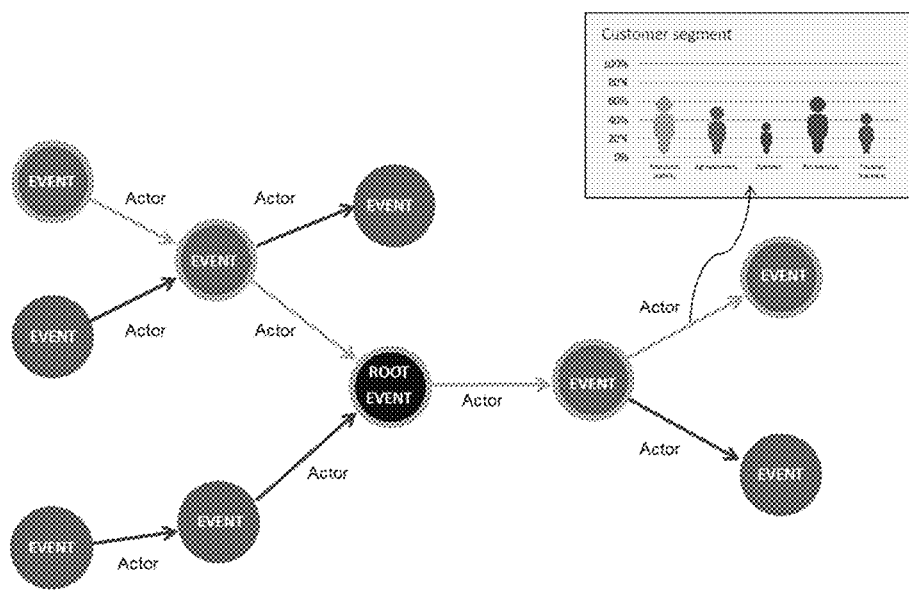
FIG. 31 is a view of a graphical user interface illustrating another example of visual representation for selecting a link between events and accessing graphs and reports associated with the link in accordance with the present disclosure.

Referring to FIG. 30, a user can select a link and access graphs/reports describing the actor's profile of the actors participating to the link. The user can select a path and access graphs and reports describing the actor's profile of the actors participating to the entire path excluding the actors that are only participating to some segment of the path. See for example FIG. 31. Once customer profile is revealed, the user can assign specific segments to the actors selected or create target lists regrouping all actors selected.

Marketing Best Practices Example Query

Figure 32:
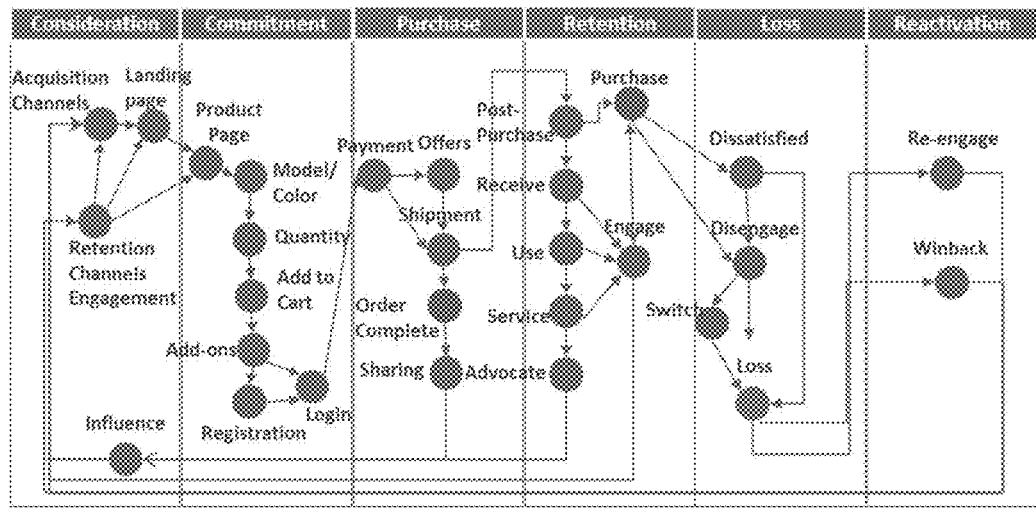
FIG. 32 is a view of a graphical user interface illustrating an example visual representation of a customer journey across an exemplary customer life cycle in accordance with the present disclosure.

FIG. 32, illustrates an example of customer journey across an exemplary customer life cycle. In certain embodiments, the system creates a taxonomy and hierarchy that categorize and group the events, metrics and KPIs. Each group represents a step in the customer life cycle. An event might be part of multiple taxonomies and hierarchies. For instance, the event "add to cart" can be in the following categories: "Conversion", "Web", "Purchasing" and into different hierarchy such as "Life Cycle", "Channel" or "Sale process." This approach enables to visualize and analyze the customer journeys in different facets—from the point of view of "Life Cycle," "Channel" or "Sale Process." In addition, each leaf in the hierarchy can be associated with relevant metrics, so paths in a story can be associated with metrics. In an aspect, initial taxonomy, hierarchy and optimization models can be prepackaged with the system as "best practices in marketing." This approach can also accelerate the training of the learning engine.

Exemplary Drivers and optimizations

Figure 33:
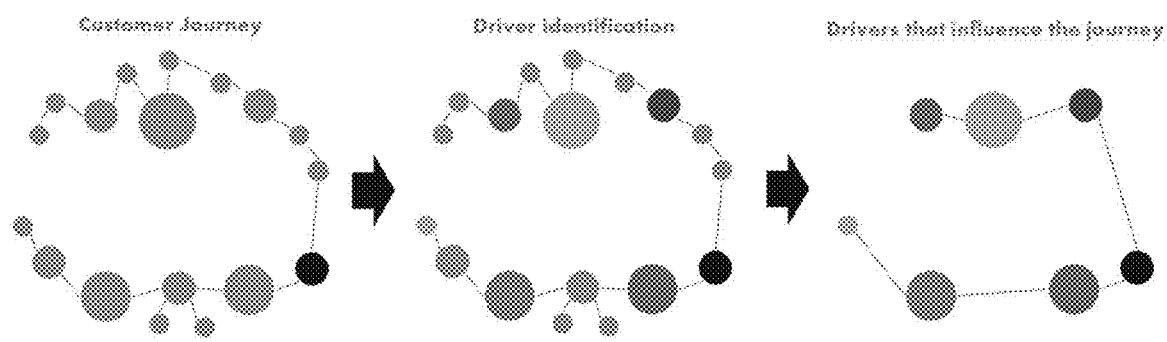
FIG. 33 is an operational flow diagram illustrating an example process performable by the system for driver identification in accordance with the present disclosure.

As provided, drivers may be events that positively or negatively influence a particular customer journey. As shown in FIG. 33, in certain embodiments a first learning engine analyzes each individual customer story and identifies the "common" story that leads to the event of interest for the entire customer base or particular customer segments. Then the learning engine identifies the events that positively or negatively influence the event of interest. These identified events are the drivers. After identifying the drivers, the learning engine determines the level of intensity and the impact of each river. The intensity is defined by the degree of positive or negative influence on the metric per occurrence (independent of the number of occurrences). The impact can be represented as the intensity value multiplied by the number of occurrence of the driver.

Figure 34:
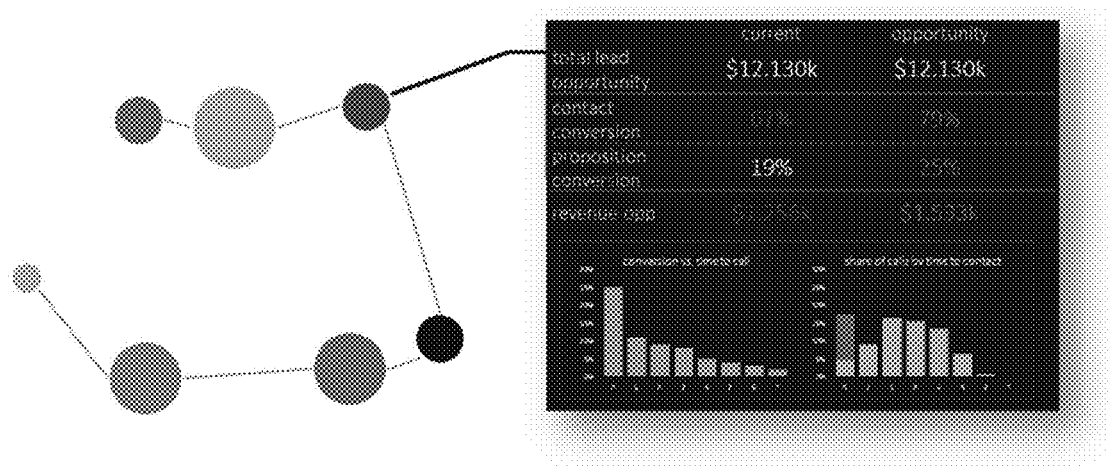
FIG. 34 is an operational flow diagram illustrating an example process performable by the system for driver optimization in accordance with the present disclosure.

Drivers can be optimized by applying analytics models stored on a model server. In certain embodiments, the association between drivers and models can be defined by a user, for example, a marketing analyst. Once the association is performed, a user can select a driver and discover what change in the customer experience is required to take advantage of an expected business impact. See for example FIG. 34.

Exemplary Executive Dashboard

In certain embodiments, an executive dashboard can be designed for marketing executives to get new marketing insights, discover opportunities across the customer journey and take optimized actions. The executive dashboard can be, for example, a rich mobile application (tablet) that the user installs on his or her device. The application may additionally support one or more of the following characteristics:

Multi-language: English and/or other languages.

Portrait vs Landscape: The application can be used in Portrait and Landscape page orientation. The functionality or information displayed may be different from one mode to another.

Drag and Drop objects: Select and move an object from one position to another and trigger an action.

Gestures: Standard gestures supported by the device can be supported by the application.

Alert/Notification: Alert and notification can be sent to the user by a trigger. If the user opens the alert/notification, the application opens and the story behind the alert/notification is displayed.

Sharing: Take a snapshot of the application, create annotation and share it with other users of the application. The recipients receive an alert on his device or in the application. Each recipient can open the snapshot and add comments. Both recipients and author are alerted when new comments are added. A snapshot can be shared via email or text message for example.

Cut/Copy/Paste: Cut, copy and paste of information to, from, and/or within the application.

Exemplary Dashboard Functionalities

In certain embodiments, once a user is logged into the application, the user may land on a home page regrouping predefined KPIs. The home page by default and the list of KPIs available are predefined by the analyst for each business role. Business roles define the default setting(s) for the user and the right and visibility on the data. For instance, the role "CMO" might have a full visibility on the entire data set when the "regional VP marketing" might only see data concerning his region. The user can add more KPIs by selecting them from the list of KPI available for his/her business role via the dashboard. The user can personalize the presentation of the home page by ordering, grouping or suppressing KPIs.

In certain embodiments, the user can select KPIs via the dashboard and apply filters on time and category. The user can drill down in the KPIs and discover the metrics composing the KPIs. Metrics can be filtered on time and category. Metrics are associated with a default graph; a different graph can be selected from a list of predefined graph available for this role.

In certain embodiments, the user can select a metric and drill down in the story behind it. The system then automatically develops the story that is influencing the metric. The level of detail (zoom) depends on the screen capabilities and usability. All the navigation, interaction and story visualization can be supported by the dashboard.

Exemplary Marketing Analytics Application

In certain exemplary embodiments, the application is a marketing analytics application that can conduct marketing and customer intelligence analysis. In certain embodiments, the marketing analytics application is designed for use by marketing analysts. Through the use of the marketing analytics application, the marketing analyst can author a new story and/or explore existing stories. They can create and view KPIs and metrics and conduct analysis based on stories. They can discover and manage customer profiles. They can create and manage triggers. The marketing analytics application can be, for example, a web application that supports multiple screen size, including multiscreen. In certain embodiments, the marketing analytics application can support various methods of user interaction, for example, interactions supported by web browsers such as Microsoft Internet Explorer, Google Chrome or Safari. In certain embodiments, the marketing analytics application can support multi-languages and user personalization as well as support accessibility constraints such as those described by "Web Content Accessibility Guidelines (WCAG) 2.0" level A).

Workspaces

In certain embodiments, the analyst interface can include one or more of the following workspaces: data view, canvas view, saved stories view, story library review metrics view, segmentation view, and triggers view. The data view can comprise, for example, a browser that displays the list of event type with associated label and value. The data view can enable analysts to dive into the meta-data and associated raw data via interactions with the view. The canvas view can comprise, for example, a search engine and/or write board to build a story graphically, execute the story and display results. After building the story, the story can be saved with all current filters. The saved story view can retrieve and modify an existing story, execute the story and display results. Once loaded, as the saved filters are still active, the story can be executed in the same way as previous. The story can be modified, re-saved or saved as a new story. The story library view allows analysts to make a story a "standard" story" that can be reviewed or monitored over time. A library of several typical stories can be pre-defined. The metrics view can include a business intelligence view that enables analysts to create metrics, reports and graphics on events. Analysts can create "sql-like" queries upon a story to calculate metric sets. Analysts can create and configure KPIs from metrics through the metrics view, and assign business roles to metrics and KPIs. The segmentation view enables analysts to discover and manage customer profiles. Analysts can see how the attributes of their customers and customer segments have changed over time and use this information to detect trends and predict future customer composition. Analysts can create and manage target groups via the segmentation view. The trigger enables analysts to create, modify or delete triggers. Triggers are actions that will be associated to a specific Path or Event. The analyst can set the trigger's rules and configure the associated action. Trigger rules include recurrence patterns, exceptions and target groups. Via the trigger view, analysts can activate or deactivate a trigger and create an event from a trigger. The created event could then be included in a story.

Event Search and Story building

In certain embodiments, a graphical interface assists a user, such as an analyst, in the story building process. The analyst can search for a specific event via a search engine or a browse hierarchy (See Marketing Best Practices Example Query) and select the event from there. Once the event is found, the analyst can drag and drop the event in the canvas. When the analyst adds a second event in the canvas, the application automatically proposes the possible connections between these events. The analyst can select one actor, define time relationship and connect the events together. It is possible that the events do not have any common actor; in this case, the events stay independent. Progressively the analyst can create a complete story by assembling events or discovering automatically what happened before, after or in between two events. The analyst can execute the story and visualize the result of the execution in a separate window. The results can be displayed progressively with a percentage of complexions and confidence.

In certain embodiments, the search engine can be very flexible and propose "intelligent" results. The search engine can support, for example, one or more of the following characteristics:

Search Actor, Label, Event Type, and descriptive metadata

Specify which fields to search

Specify exact match

Specify other search constraints

Display details of search results

Search results are ranked by relevance

See statistics for each search result

Display descriptive metadata for each search result

Constrain search options by having common Actors with Event (s) in canvas

Display existing stories already attached to the selected Event

Exemplary Real-Time Triggers

Figure 35:
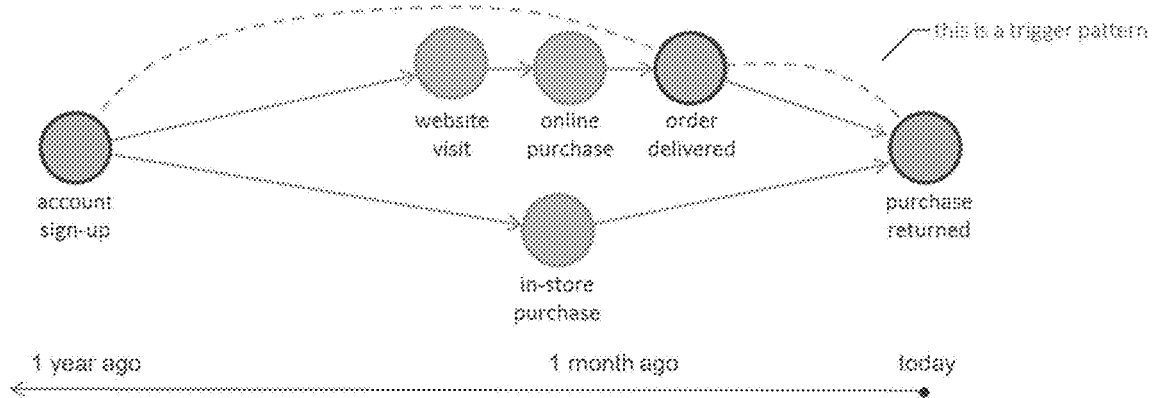
FIG. 35 is an operational flow diagram illustrating an example trigger process performable by the system accordance with the present disclosure.

As outlined above, a trigger is defined by a path (a selection of a suite of events in for a customer journey), trigger rules, and an associated trigger action. See example FIG. 35 for an example trigger.

1. Trigger Path

A path comprises a succession of consecutive events in a story or journey. Depending on the zoom level, a story can be an individual customer experience or an aggregation of multiple customer experiences. In the case of an aggregation of multiple customer experiences, the events presented are events identified by the learning engine as being the most "important" across each customer's respective story. A selected path includes events that are present in each individual aggregated story so they can be monitored. In certain embodiments, a path can include an exclusion event (e.g., a period of time relative to other events when the event excluded must not occur). If a path includes an exclusion event, then in certain embodiments, a scheduler triggers the action associated with the path when the conditions included in the exclusion event are matched.

2. Trigger Rule

The trigger's rules defining the conditions associated with the trigger and its recurrences. For example, the rules can define when the action can be a trigger (e.g. every Monday between 8 am and 6 pm and only once) and define who is targeted (e.g. Target List "Young professional").

3. Triggering Action

Figure 36:
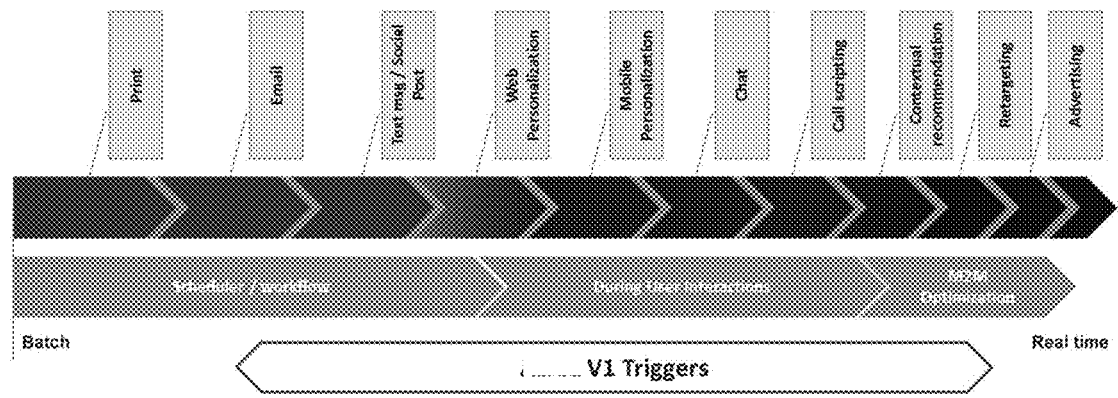
FIG. 36 is a chart illustrating example types of campaigns with relative timing and triggers.

The system can monitor the data flow in "real-time" and trigger the appropriate action. The concept of real time is relative to the kind of marketing campaign that the customer wants to execute and the kind of marketing channel. FIG. 36 shows example of types of campaigns, how real-time they need to be, and how the actions are triggered. The system may support various kind of triggers. One such trigger can be, for example, advertising.

Figure 37:
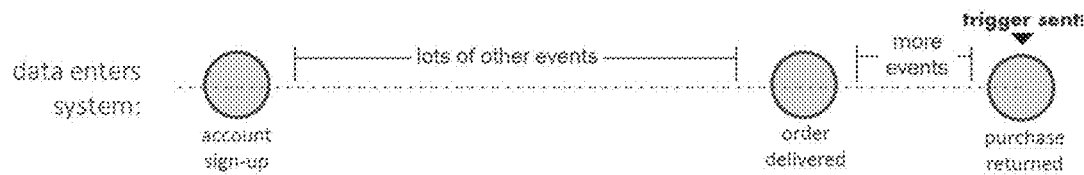
FIG. 37 is an operational flow diagram illustrating another trigger process performable by the system accordance with the present disclosure.
Figure 38:
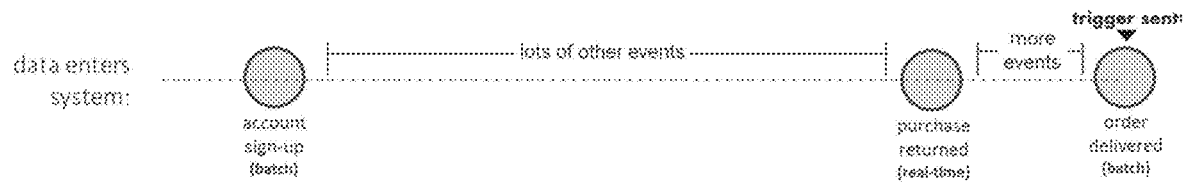
FIG. 38 is an operational flow diagram illustrating another example trigger process performable by the system in accordance with the present disclosure.

In certain embodiments, in case of data streaming, the sequence of triggers can be in the same order as the trigger path. See for example FIG. 37. In certain embodiments, in the case of a combination of batch data integration and data streaming, the order of the events can be different than the trigger path, but the action is still triggered as soon as the patch is matched. See for example FIG. 38.

To launch an action, the trigger may call a model of the model server of the system. In certain embodiments, the model is executed by a self-contained application so that it can take other actions like contacting a web service, creating a new event, or sending an email. Depending on the execution engine, the action might be as simple as sending an email, or more complex such as proposing the best next action to an email automation engine such as ExtactTarget or Adobe Campaign. In certain embodiments, the Trigger might be integrated with third party execution engines such as ExactTarget, Adobe Campaign, Marketo, Saleforce and the like. In an exemplary case, a specific connector is added to connect the system triggers with the targeted execution engine.

Figure 39:
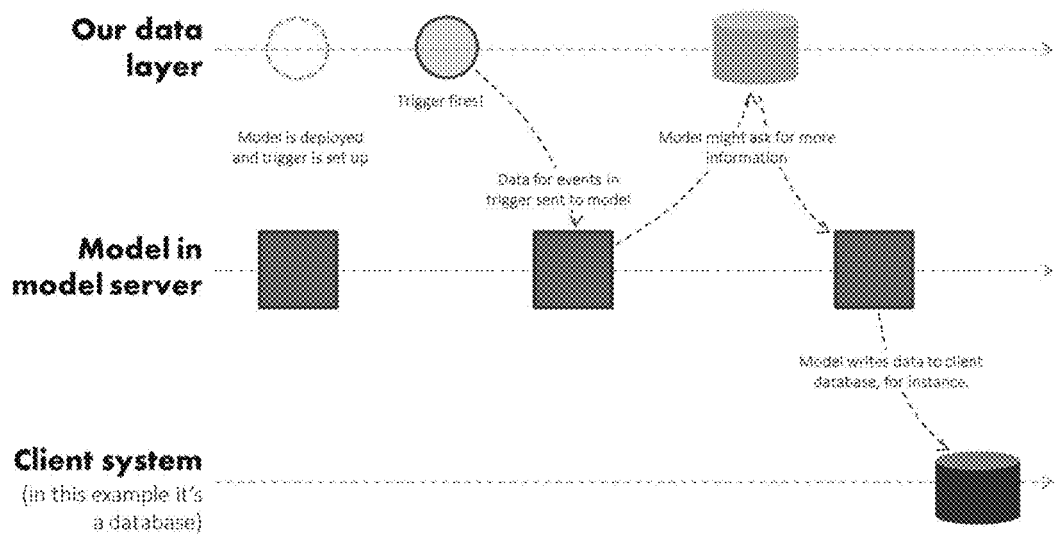
FIG. 39 is an operational flow diagram illustrating an example trigger process performable by the system in accordance with the present disclosure, in which a model is triggered when customers return an online order.

FIG. 39 illustrates an example of a model that is triggered when customers return an online order. The example model evaluates the properties of the customer and then, if appropriate, adds a record to a mailing list in a database.

Exemplary Data integration

Figure 40:
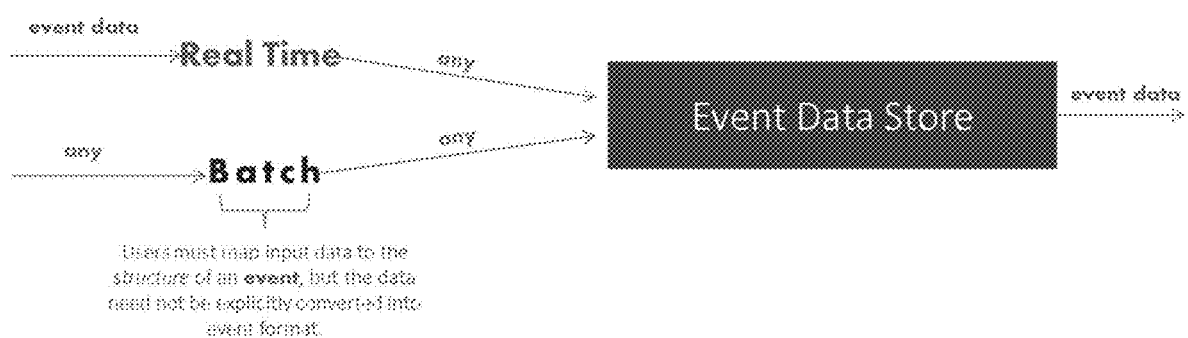
FIG. 40 illustrates an example data integration process performable by the system to ingest data from patch processing or real-time streaming in accordance with the present disclosure.

FIG. 40 illustrates an example data integration process performable by the system to ingest data from patch processing or real-time streaming in accordance with the present disclosure. In certain embodiments, the system includes an event data store that receives raw data, transform the raw data into in event data format (see FIG. 41 for an exemplary event data format), and output the transformed data into the in-memory machine learning platform. The event data store can also store data within itself, the data stored within can be in raw format or event data format. Thus although received data is transformed into event data format, the received data can be stored need not be in event data format. In certain embodiments, as the in-memory platform can handle real-time data, the event data store can be configured to "push" new data from streaming sources into the in-memory platform, and to "pull" data when a node in the in-memory cluster starts up.

Figure 42:
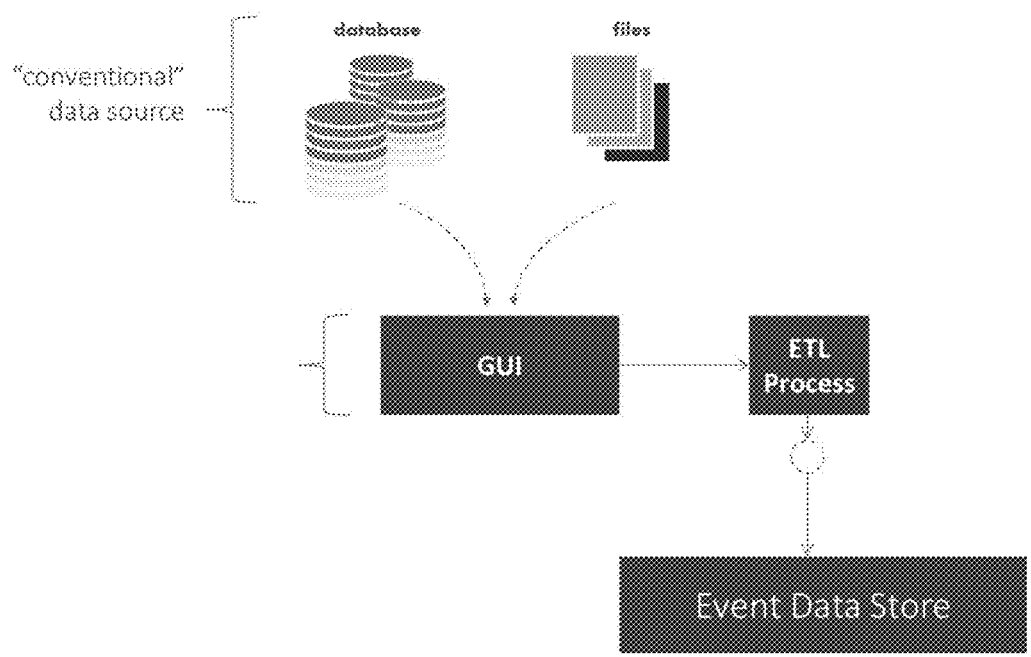
FIG. 42 illustrates an exemplary batch processing process performable by the system in accordance with the present disclosure.

FIG. 42 illustrates an exemplary batch processing process in accordance with the present disclosure. In certain embodiments, the system provides batch ETL processes for data received through an EFT tool. In certain embodiments, the tool is an Off-the-shelf ETL tool like Pentaho or Talend, and the system uses the EFT tool to provide mapping of columnar data to event formatted data. In certain embodiments, the EFT tool need not necessarily convert data into event formatted data, and in such embodiments the tool can enable persistence of the event mapping so that data can be retrieved as events.

Figure 43:
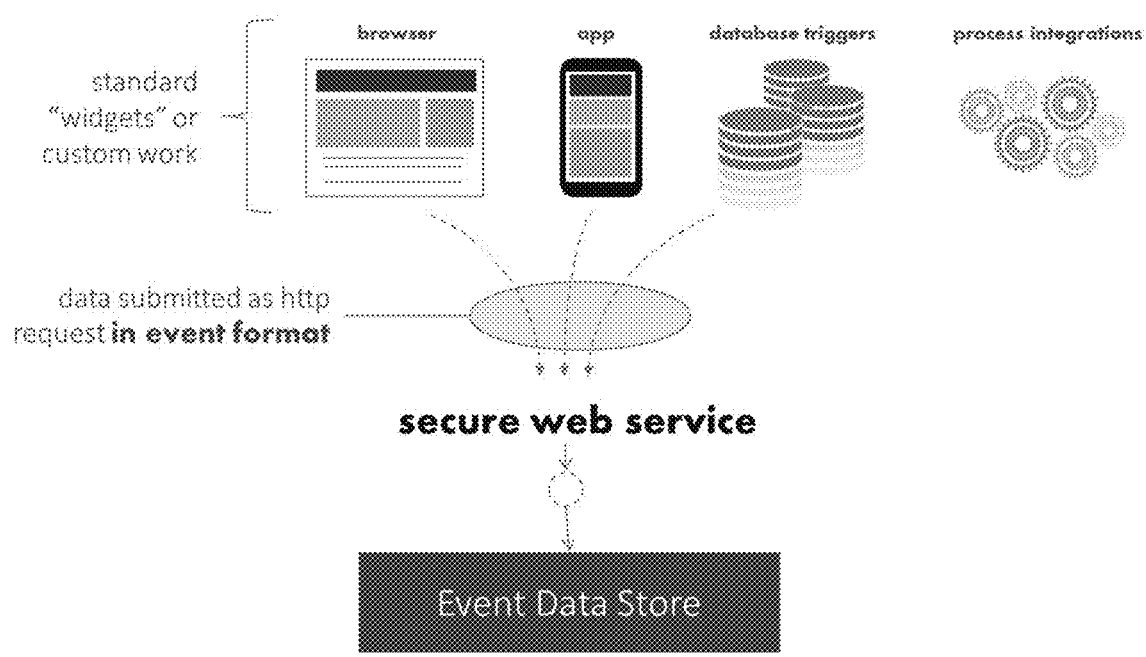
FIG. 43 illustrates an exemplary real-time ingestion process performable by the system in accordance with the present disclosure.

FIG. 43 illustrates an exemplary real-time ingestion process in accordance with the present disclosure. In certain embodiments, the system receives "streaming" data in event data format through a write-only http API. In certain embodiments, one data element is received at a time.

While certain embodiments have been described herein, the disclosure should be understood as capable of being applied to a variety of contexts and technological fields beyond those explicitly addressed.

Further, when the logical operations described herein are implemented in software, the process may execute on any type of computing architecture or platform. For example, referring to FIG. 44, an example computing device upon which embodiments of the invention may be implemented is illustrated. In particular, the system may operate using one or more computing devices, such as computing device 400 shown in FIG. 44.

Figure 44:
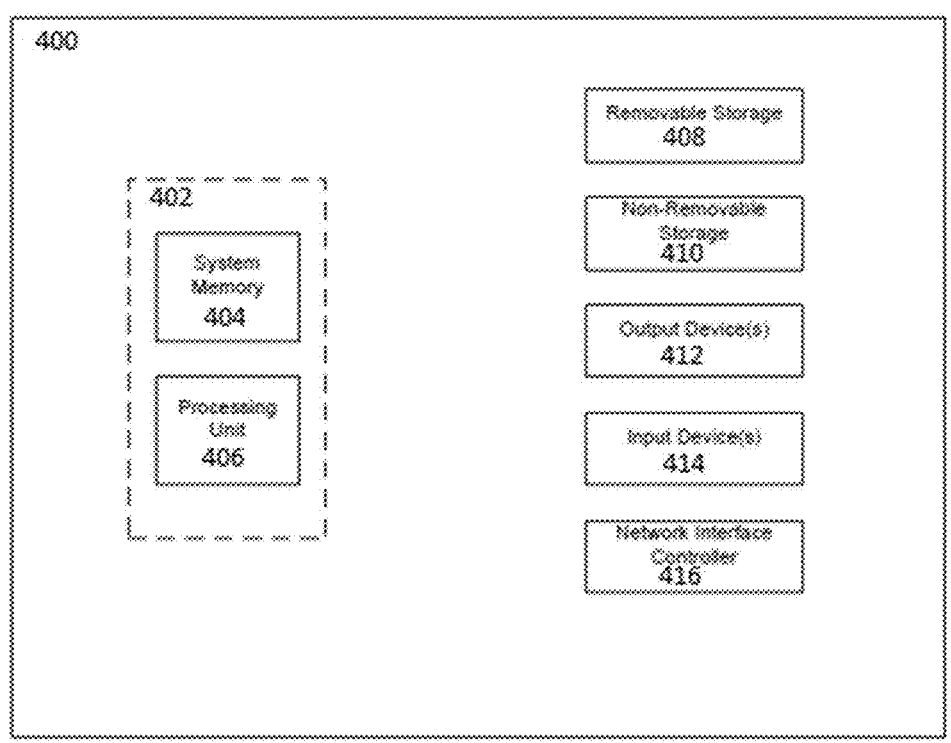
FIG. 44 is a block diagram showing an exemplary computing environment in which example implementations and aspects may be implemented.

The computing device 400 may include a bus or other communication mechanism for communicating information among various components of the computing device 400. In its most basic configuration, computing device 400 typically includes at least one processing unit 406 and system memory 404. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 44 by dashed line 402. The processing unit 406 may be a standard programmable processor that performs arithmetic and logic operations necessary for operation of the computing device 400.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 314 such as a keyboard, mouse, touch screen, etc. Output device(s) 412 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Computer-readable media refers to any media that is capable of providing data that causes the computing device 400 (i.e., a machine) to operate in a particular fashion. Various computer-readable media may be utilized to provide instructions to the processing unit 406 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

Computing device 400 typically includes a variety of computer-readable media. Computer-readable media can be any available media that can be accessed by device 400 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

What is claimed is:

1. A system for graphically constructing a query for processing event data and identifying connections between two or more events, the system comprising:
   at least one user interface comprising a canvas and a data component module, wherein the data component module comprises at least one of a search engine or a browsable hierarchy;
   at least one data repository comprising a plurality of events characterized by at least a timestamp, an event type, and at least one actor; and
   at least one processor;
   wherein the at least one user interface is configured to accept first event criteria of a first event and to communicate with the at least one data module to list the event data related to the first event criteria;
   wherein upon acceptance of the first event criteria, the at least one user interface is further configured to accept placement of the first event onto the canvas;
   wherein the at least one user interface is further configured to accept second event criteria of a second event and to communicate with the at least one processor to list the event data related to the second event criteria;
   wherein upon acceptance of the second event criteria, at least one user interface is further configured to accept placement of the second event onto the canvas;
   wherein the at least one processor is configured to, upon the placement of the second event onto the canvas, generate a plurality of possible connections between the first event and the second event and to output the plurality of possible connections, wherein each of the plurality of possible connections comprises a link between two events specifying at least one shared actor and a time relationship between the two events,
   wherein the at least one processor is further configured to list the event data related to the first event criteria or the second event criteria according to historical user entries and selections,
   wherein the at least one processor is further configured to generate the plurality of possible connections between the first event and the second event according to the historical user entries and selections,
   wherein the at least one processor is further configured to rank the plurality of possible connections according to the historical user entries and selections;
   wherein, when there exists no shared actor between the first event and the second event, the at least one user interface displays the first event and the second event as independent of each other;
   wherein the at least one processor is further configured to derive a plurality of story metrics according to the events, the at least one actor, and the connections between the events;
   wherein the at least one processor is further configured to generate a story and select a connection, wherein, upon the generation of the story, the at least one processor in communication with the at least one user interface is further configured to generate a graphical representation of story metrics associated with the selected connection;
   wherein the at least one processor is further configured to identify recommended additions to the query according to at least one user input, where the recommended additions include at least one of an event type, at least one common actor, at least one actor state, and a chronological relationship between all events; and
   wherein the at least one processor, in communication with the at least one user interface, generates a list of the recommended additions ordered by relevance according to a chronological relationship between all events or actors shared by all events.

2. The system of claim 1, wherein, upon the selection of at least one of the plurality of possible connections via the at least one user interface, the at least one processor generates an associated story pursuant to the selection and displays a graphical representation of the associated story, wherein the user interface is further configured to zoom into the canvas, wherein the zooming is a function of at least one of a plurality of sliders comprising a frequency of the actor in the story, a time in the story, or a depth in the story, wherein each story is a pattern representing a plurality of events related via shared connections.

3. The system of claim 1, wherein the at least one processor is further configured to select a root event from the first event and the second event.

4. The system of claim 3, wherein either the first event or the second event, depending on which occurs latest in time, is automatically selected as the root event.

5. The system of claim 3,
wherein the root event serves as a reference by which all story metrics will be aggregated;
wherein the root event serves as a chronological reference by which all relative time relationships between story events will be anchored and all story metrics will be aggregated; and
wherein the story metrics comprise flow, contribution rate, conversion rate, and dropout rate.

* * * * *